(12) United States Patent
Moon et al.

(10) Patent No.: US 9,317,975 B2
(45) Date of Patent: Apr. 19, 2016

(54) METHOD OF DISPLAYING THREE-DIMENSIONAL IMAGE AND THREE-DIMENSIONAL IMAGE DISPLAY APPARATUS PERFORMING THE SAME

(71) Applicant: Samsung Display Co., LTD., Yongin, Gyeonggi-Do (KR)

(72) Inventors: Gyeong-Ub Moon, Suwon-si (KR); Hyun-Seok Ko, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 217 days.

(21) Appl. No.: 13/968,712

(22) Filed: Aug. 16, 2013

(65) Prior Publication Data

US 2014/0146040 A1      May 29, 2014

(30) Foreign Application Priority Data

Nov. 27, 2012  (KR) .......................... 10-2012-0134998

(51) Int. Cl.
   *H04N 13/04*      (2006.01)
   *G06T 19/20*      (2011.01)
   *G06F 3/01*       (2006.01)

(52) U.S. Cl.
   CPC .............. *G06T 19/20* (2013.01); *G06F 3/013* (2013.01); *H04N 13/0413* (2013.01); *H04N 13/0475* (2013.01); *H04N 13/0479* (2013.01)

(58) Field of Classification Search
   None
   See application file for complete search history.

(56) References Cited

U.S. PATENT DOCUMENTS

| | | | |
|---|---|---|---|
| 6,094,216 A * | 7/2000 | Taniguchi et al. | 348/51 |
| 2002/0113868 A1 | 8/2002 | Park | |
| 2006/0126177 A1 * | 6/2006 | Kim et al. | 359/465 |
| 2008/0266387 A1 * | 10/2008 | Krijn et al. | 348/51 |
| 2010/0189413 A1 * | 7/2010 | Yoshino | 386/83 |
| 2010/0245369 A1 * | 9/2010 | Yoshino | 345/522 |
| 2011/0051239 A1 * | 3/2011 | Daiku | 359/464 |
| 2011/0234582 A1 * | 9/2011 | Daiku et al. | 345/419 |
| 2011/0304472 A1 | 12/2011 | Chou et al. | |
| 2012/0092470 A1 * | 4/2012 | Okamoto | 348/60 |
| 2012/0162762 A1 * | 6/2012 | Takahashi | 359/462 |
| 2012/0194495 A1 * | 8/2012 | Kadowaki | 345/208 |

(Continued)

FOREIGN PATENT DOCUMENTS

| | | |
|---|---|---|
| EP | 0540137 A1 | 5/1993 |
| EP | 2448283 A2 | 5/2012 |

(Continued)

OTHER PUBLICATIONS

Extended European Search Report for Application No. 13180746.3-1902 dated Feb. 24, 2014.

(Continued)

*Primary Examiner* — Kee M Tung
*Assistant Examiner* — Ryan M Gray
(74) *Attorney, Agent, or Firm* — Cantor Colburn LLP

(57) ABSTRACT

A three-dimensional image display apparatus includes a panel including a plurality of pixels and which displays an image, a relative viewer angle determining part which determines a relative viewer angle, where the relative viewer angle is a relative angle of a viewer with respect to the panel, and a light converting part which transmits the image on the panel to a left eye and a right eye of the viewer based on the relative viewer angle, where the light converting part includes a plurality of light converting units which is arranged substantially in a matrix form and generates a pattern.

32 Claims, 27 Drawing Sheets

(56) References Cited

U.S. PATENT DOCUMENTS

| | | | |
|---|---|---|---|
| 2012/0194751 A1* | 8/2012 | Lo et al. | 349/15 |
| 2012/0242723 A1* | 9/2012 | Miyake | 345/694 |
| 2012/0314024 A1* | 12/2012 | Tsang | 348/43 |
| 2013/0050594 A1* | 2/2013 | Hirayama et al. | 349/15 |

FOREIGN PATENT DOCUMENTS

| | | | |
|---|---|---|---|
| JP | 4348487 B1 | 10/2009 |
| KR | 1020110098253 A | 9/2011 |
| KR | 1020120004855 A | 1/2012 |
| WO | 0070882 A1 | 11/2000 |
| WO | 2012021129 A1 | 2/2012 |

OTHER PUBLICATIONS

European Office Action for Application No. 13 180 746.3-1902 dated Oct. 23, 2015.

* cited by examiner

D400

D400

D400

D400

METHOD OF DISPLAYING THREE-DIMENSIONAL IMAGE AND THREE-DIMENSIONAL IMAGE DISPLAY APPARATUS PERFORMING THE SAME

This application claims priority to Korean Patent Application No. 10-2012-0134998, filed on Nov. 27, 2012, and all the benefits accruing therefrom under 35 U.S.C. §119, the content of which in its entirety is herein incorporated by reference.

BACKGROUND

1. Field

Exemplary embodiments of the invention relate to a method of displaying a three-dimensional ("3D") image and a 3D image display apparatus performing the method. More particularly, exemplary embodiments of the invention relate to a method of displaying a 3D image based on change of a viewpoint of a viewer and a 3D image display apparatus performing the method.

2. Description of the Related Art

Various technologies are applied to a display apparatus to display a 3D image. For example, the display apparatus may be a shutter glass type using alternately opening left eye and right eye of a viewer corresponding to a driving cycle, a film patterned retarder ("FPR") type using a polarizing film and an auto-stereoscopic type.

In the above types of the display apparatus, the viewer may recognize the 3D image when an angle of two eyes of the viewer is set to be substantially equal to an angle of a display panel.

When the angle of two eyes of the viewer is inclined with respect to the angle of the display panel, a luminance of the image may be substantially decreased due to a difference between a polarizing angle of glasses and a polarizing angle of the display panel in the FPR type, and the 3D image may not be shown to the viewer due to change of positions of the eyes of the viewer in the auto-stereoscopic type.

When the angle of the eyes of the viewer is inclined with respect to the angle of the display panel, a binocular parallax angle of the viewer is not equal to a binocular parallax angle of the image displayed on the display panel.

When the angle of the eyes of the viewer is inclined with respect to the angle of the display panel in the auto-stereoscopic type, viewpoints for the left eye and the right eye of the viewer for the 3D image are changed such that a left image and a right image may not be effectively distinguished.

SUMMARY

Exemplary embodiments of the invention provide a method of displaying an optimized three-dimensional ("3D") image based on a change of a viewpoint of a viewer.

Exemplary embodiments of the invention provide a display apparatus for performing the method of displaying the 3D image.

In an exemplary embodiment of a 3D image display apparatus according to the invention, the 3D image display apparatus includes a panel including a plurality of pixels and which displays an image, a relative viewer angle determining part which determines a relative viewer angle, where the relative viewer angle is a relative angle of a viewer with respect to the panel, and a light converting part which transmits the image on the panel to a left eye and a right eye of the viewer based on the relative viewer angle, where the light converting part includes a plurality of light converting units which is arranged substantially in a matrix form and generates a pattern.

In an exemplary embodiment, the pattern may be inclined based on the relative viewer angle.

In an exemplary embodiment, the pattern may be adjusted based on a distance of the viewer from the panel.

In an exemplary embodiment, the pattern may be a barrier pattern including transmitting areas in a stripe shape. In such an embodiment, when the distance of the viewer from the panel increases, a gap between adjacent transmitting areas of the pattern may be increased.

In an exemplary embodiment, the pattern may be a barrier pattern including transmitting areas in a curved line shape. In such an embodiment, when the distance of the viewer from the panel increases, a gap between adjacent transmitting areas of the pattern may be increased. In such an embodiment, when the distance of the viewer from the panel increases, a curvature of the pattern may be decreased.

In an exemplary embodiment, the pattern may be a barrier pattern including transmitting areas in a polygonal line shape. When the distance of the viewer from the panel increases, a gap between adjacent transmitting areas of the pattern may be increased. In such an embodiment, when the distance of the viewer from the panel increases, a bending angle of the polygonal line shape may be decreased.

In an exemplary embodiment, the pattern may be adjusted based on a distance of the viewer from the pixel of the panel.

In an exemplary embodiment of a method of displaying a 3D image, the method includes determining a relative viewer angle and outputting a compensated image based on the relative viewer angle, where the relative viewer angle is a relative angle of a viewer with respect to a panel which displays the 3D image.

In an exemplary embodiment, the panel may include an image display panel which displays an image and a barrier panel disposed on the image display panel, where the barrier panel includes a plurality of barrier unit which generates a barrier pattern. In such an embodiment, the outputting the compensated image based on the relative viewer angle may include controlling the barrier pattern based on the relative viewer angle.

In an exemplary embodiment, the barrier units may be arranged substantially in a matrix form.

In an exemplary embodiment, the barrier pattern may have a plurality of stripe patterns substantially parallel to each other.

In an exemplary embodiment, a width of the stripe patterns and a gap of the stripe patterns may be adjusted based on the relative viewer angle.

In an exemplary embodiment, the width of the stripe patterns and the gap of the stripe patterns may decrease when the relative viewer angle decreases.

In an exemplary embodiment, the determining the relative viewer angle includes determining an absolute angle of the panel with respect to a direction of gravity, determining an absolute angle of eyeballs of the viewer with respect to the direction of gravity, and calculating the relative viewer angle using the absolute angle of the panel and the absolute angle of the eyeballs of the viewer.

In an exemplary embodiment, the determining the absolute angle of the panel may include using a panel sensor adhering to the panel.

In an exemplary embodiment, the determining the absolute angle of the eyeballs of the viewer may include using a sensor which detects the eyeballs of the viewer.

In an exemplary embodiment, the determining the absolute angle of the eyeballs of the viewer may include using a sensor in glasses of the viewer.

In an exemplary embodiment, the determining the relative viewer angle may include using a sensor in the panel, where the sensor detects eyeballs of the viewer.

In an exemplary embodiment, the outputting the compensated image based on the relative viewer angle may include providing light in a path corresponding to viewpoints of the viewer using a directional backlight unit. In such an embodiment, the directional backlight unit may include a plurality of backlight portions independently driven and arranged substantially in a matrix form. In such an embodiment, the directional backlight unit may be driven in an inclined direction corresponding to the relative viewer angle.

In an exemplary embodiment, the outputting the compensated image based on the relative viewer angle may include providing images corresponding to viewpoints of the viewer using a liquid crystal lens panel. In such an embodiment, the liquid crystal lens panel may include a plurality of liquid crystal lenses independently driven and arranged substantially in a matrix form. In such an embodiment, the liquid crystal lens panel may be driven in an inclined direction corresponding to the relative viewer angle.

In an exemplary embodiment, the outputting the compensated image based on the relative viewer angle may include compensating an image direction of the 3D image generated based on the relative viewer angle.

In an exemplary embodiment, the compensating the image direction may include increasing a distance between a left image and a right image for the viewer from each other in a direction corresponding to the relative viewer angle.

In an exemplary embodiment, the method may further include detecting a relative position of the viewer with respect to the panel and compensating the image based on the relative position of the viewer.

In an exemplary embodiment, the compensating the image based on the relative position of the viewer may include reconstructing a portion of an object in the image shown to the viewer based on the relative position of the viewer by a data converting method In an exemplary embodiment, the method may further include detecting a distance between eyeballs of the viewer and compensating the image based on the distance between the eyeballs of the viewer.

In an exemplary embodiment, left and right images of a close image may be compensated to overlap each other in 3D image data, when the distance between the eyeballs is less than a predetermined distance.

In an exemplary embodiment, left and right images of a central image may be compensated to overlap each other in 3D image data, when the distance between the eyeballs is substantially the same as a predetermined distance.

In an exemplary embodiment, left and right images of a far image may be compensated to overlap each other in 3D image data, when the distance between the eyeballs is greater than a predetermined distance.

In an exemplary embodiment, the method may further include detecting a thickness of a crystalline lens of the viewer and compensating the image based on the thickness of the crystalline lens of the viewer.

In an exemplary embodiment, left and right images of a close image may be compensated to overlap each other in 3D image data, when the thickness of the crystalline lens of the viewer is greater than a predetermined thickness.

In an exemplary embodiment, left and right images of a far image may be compensated to overlap each other in 3D image data, when the thickness of the crystalline lens of the viewer is less than a predetermined thickness.

In an exemplary embodiment, the method may further include determining an image source.

In an exemplary embodiment, the image source may include a stereo camera image, a two-dimensional ("2D") image and a 3D rendering image. In such an embodiment, the stereo camera image may include a first camera image corresponding to a left image for a left eye of the viewer and a second camera image corresponding to a right image for a right eye of the viewer. In such an embodiment, the 3D rendering image may include a plurality of images corresponding to a plurality of viewpoints.

In an exemplary embodiment, the method may further include rearranging the first camera image and the second camera image corresponding to the relative viewer angle when the image source is the stereo camera image.

In an exemplary embodiment, the method may further include converting the 2D image into a left image and a right image corresponding to the relative viewer angle when the image source is the 2D image.

In an exemplary embodiment, the method may further include compensating the 3D rendering image based on a position of the viewer to generate a position-compensated 3D rendering image and converting the position-compensated 3D rendering image into a left image and a right image corresponding to the relative viewer angle when the image source is the 3D rendering image.

According to exemplary embodiments of the method of displaying the 3D image and the display apparatus for performing the method, a relative viewer angle is determined using an absolute panel angle and an absolute viewer angle, and an image is displayed using the relative viewer angle such that the 3D image may be effectively recognized by the viewer when the viewer is relatively inclined with respect to the display panel.

In such embodiments, a light converting unit, e.g., a barrier panel, a directional backlight unit and a liquid crystal lens, is driven based on the relative viewer angle such that the 3D image may be effectively recognized by the viewer when the viewer is relatively inclined with respect to the display panel.

In such embodiments, the 3D image is compensated based on a distance between eyeballs of the viewer and a thickness of crystalline lens of the viewer such that the viewer may effectively recognize the 3D image.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

Figure 1:
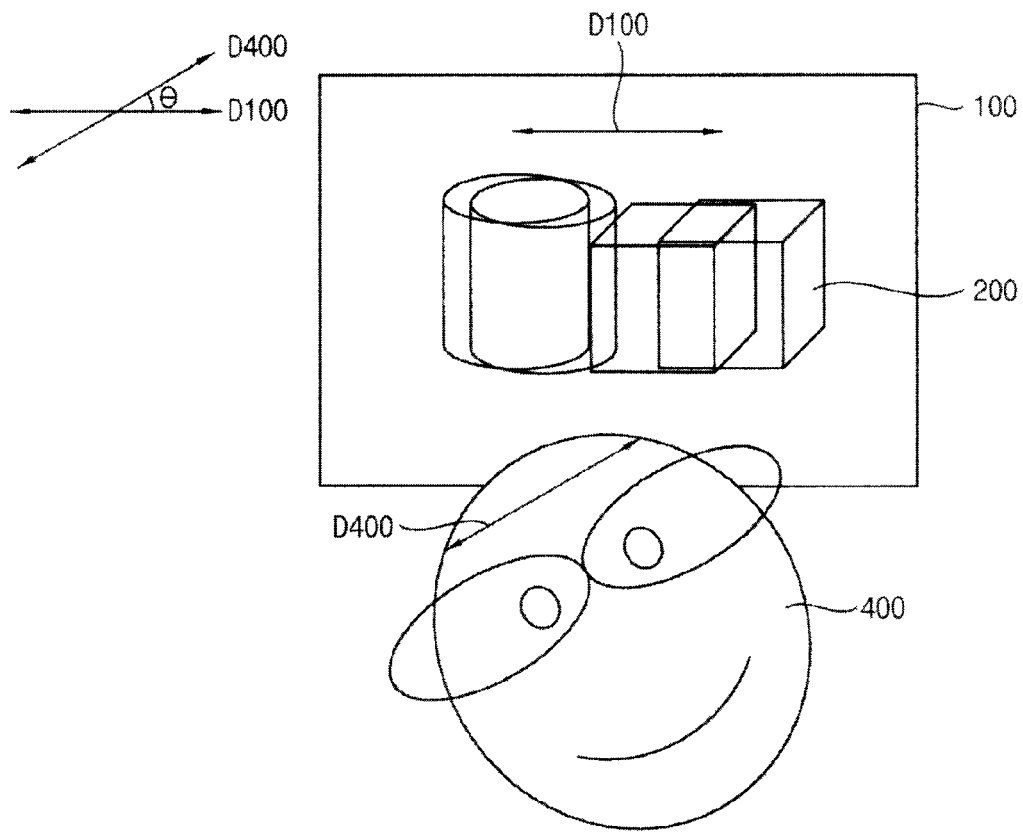
FIG. 1 is a conceptual diagram illustrating an exemplary embodiment of a method of displaying a three-dimensional ("3D") image according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected.

Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a conceptual diagram illustrating an exemplary embodiment of a method of displaying a three-dimensional ("3D") image according to the invention.

Referring to FIG. 1, an exemplary embodiment of a method of displaying the 3D image includes determining a relative viewer angle θ and outputting a converted image based on the relative viewer angle A. The relative viewer angle θ is defined as an angle of two eyeballs of a viewer 400 with respect to a panel 100. In an exemplary embodiment, the relative viewer angle θ may be defined as an angle of a line connecting the two eyeballs of the viewer 400 with respect to a direction of the panel 100 (e.g., a horizontal line of the panel 100). In such an embodiment, the determining the relative viewer angle θ includes determining an absolute angle of the panel 100, determining an absolute angle of the eyeballs of the viewer 400 and calculating the relative viewer angle θ using the absolute angle of the panel 100 and the absolute angle of the eyeballs of the viewer 400.

In an embodiment, where a display device including the panel 100 is a mobile apparatus, the panel 100 may be inclined with respect to a horizontal direction (e.g., a direction substantially perpendicular to a direction of gravity). Accordingly, in such an embodiment, the panel 100 may display an image 200 in an inclined status. In one exemplary embodiment, for example, a direction D100 of the panel 100 may be determined using a sensor disposed at the panel 100.

The viewer 400 may sometimes view the panel 100 in an inclined angle with respect to the horizontal direction. An inclined direction D400 of the viewer 400 (also referred to as a "viewer direction") may be determined using various methods. To display the 3D image, different images are provided to a left eye of the viewer and a right eye of the viewer and the viewer recognizes the 3D image. In an exemplary embodiment, determining a relative angle θ of the viewer with respect to the display panel 100 (e.g., the relative viewer angle) is performed to effectively provide the different images for the left eye and the right eye of the viewer. In such an embodiment, the 3D image may be effectively displayed based on the relative viewer angle θ when the viewer 400 is inclined with respect to the panel 100 by an angle.

Figure 2:
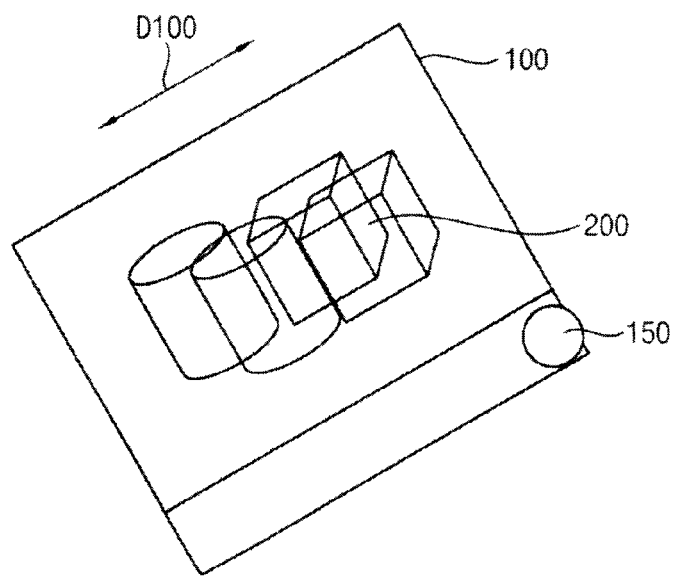
FIG. 2 is a conceptual diagram illustrating an exemplary embodiment of a method of determining an angle of a panel in a method of displaying a 3D image according to the invention.

FIG. 2 is a conceptual diagram illustrating an exemplary embodiment of a method of determining an angle of a panel in a method of displaying a 3D image according to the invention.

Referring to FIG. 2, in an exemplary embodiment, the panel 100 includes a panel sensor 150. The panel sensor 150 is disposed in a portion of the panel 100. The panel sensor 150 measures an inclined direction D100 of the panel 100. An absolute angle of the panel 100 (e.g., an angel of the panel 100 with respect to the direction of gravity) is determined using the direction D100 of the panel 100. In one embodiment, for example, the panel sensor 150 may be a gravity sensor, but not being limited thereto. In an alternative exemplary embodiment, at least one of various sensors that measure the direction of the panel 100 may be included in the panel sensor 150.

Figure 3:
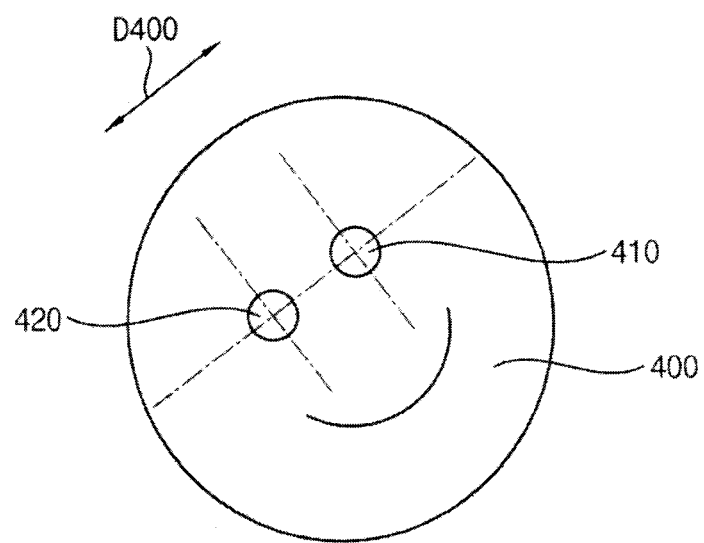
FIG. 3 is a conceptual diagram illustrating an exemplary embodiment of a method of determining an angle of a viewer in a method of displaying a 3D image according to the invention.

FIG. 3 is a conceptual diagram illustrating an exemplary embodiment of a method of determining an angle of a viewer in a method of displaying a 3D image according to the invention.

Referring to FIG. 3, in an exemplary embodiment, an inclined direction D400 of eyeballs 410 and 420 of the viewer 400 may be measured using an eyeball sensor. In such an embodiment, the inclined direction D400 of the viewer 100 is measured based on an absolute angle of a line between the eyeballs 410 and 420 of the viewer 400, e.g., an angle of the eyeballs 410 and 420 of the viewer with respect to the direction of gravity, measured by the eyeball sensor. In an alternative exemplary embodiment, relative positions of the eyeballs 410 and 420 of the viewer may be determined by a measuring device disposed at a panel such as camera. The inclined direction D400 of the eyeballs 410 and 420 of the viewer 400 may be calculated based on an inclination of the measuring device that determines the relative positions of the eyeballs 410 and 420 of the viewer 400 such that the inclined direction D400 of the viewer 400 with respect to the direction of gravity is determined.

In an exemplary embodiment, when the absolute angle of the viewer 400 is determined, the relative viewer angle θ may be determined using the absolute angle of the panel 100. In such an embodiment, the images 200 are converted using the relative viewer angle θ such that the viewer effectively recognizes the 3D image.

In an exemplary embodiment, where the eyeball sensor is disposed on (e.g., adhered to) the panel 100, the relative viewer angle θ may be determined using the eyeball sensor at the panel 100. When the panel 100 is inclined, the eyeball sensor is also inclined in an angle substantially the same as an inclined angle of the panel 100. Thus, the angle of the viewer determined by the inclined eyeball sensor is substantially equal to the relative viewer angle θ.

Figure 4:
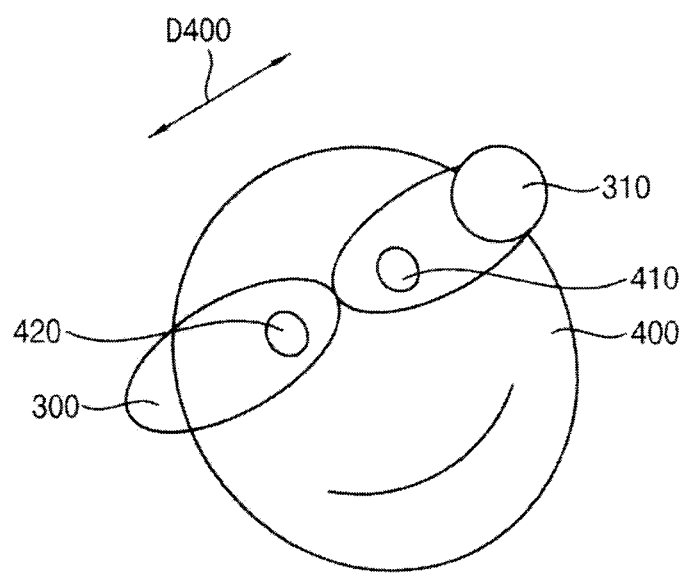
FIG. 4 is a conceptual diagram illustrating an exemplary embodiment of a method of determining an angle of a viewer in a method of displaying a 3D image according to the invention.

FIG. 4 is a conceptual diagram illustrating an exemplary embodiment of a method of determining an angle of a viewer in a method of displaying a 3D image according to the invention.

Referring to FIG. 4, an exemplary embodiment of the method of determining an angle of a viewer in a method of displaying a 3D image uses a sensor 310 included in glasses 300 for the 3D image, where the glasses 300 is used to display the 3D image. In such an embodiment, where the glasses 300 are used to display the 3D image, the absolute angle of the viewer may be determined using the sensor 310 of the glasses 300. The sensor 310 may perform a function substantially similar to a function of the sensor 150 provided in the panel 100 in FIG. 2. In one exemplary embodiment, for example, the sensor 310 may be a gravity sensor.

In an exemplary embodiment, the inclined direction D400 of the viewer 400 may be determined using the sensor 310 in the glasses 300 and the absolute angle of eyeballs 410 and 420 of the viewer 400 may be determined using the inclined direction D400 of the viewer 400.

In one exemplary embodiment, for example, when the viewer is inclined and the panel 100 is not inclined, the relative viewer angle θ is substantially the same as the absolute angle of the viewer. Thus, when the angle of the panel 100 is fixed, the relative viewer angle θ may be determined using the sensor 310.

Figure 5:
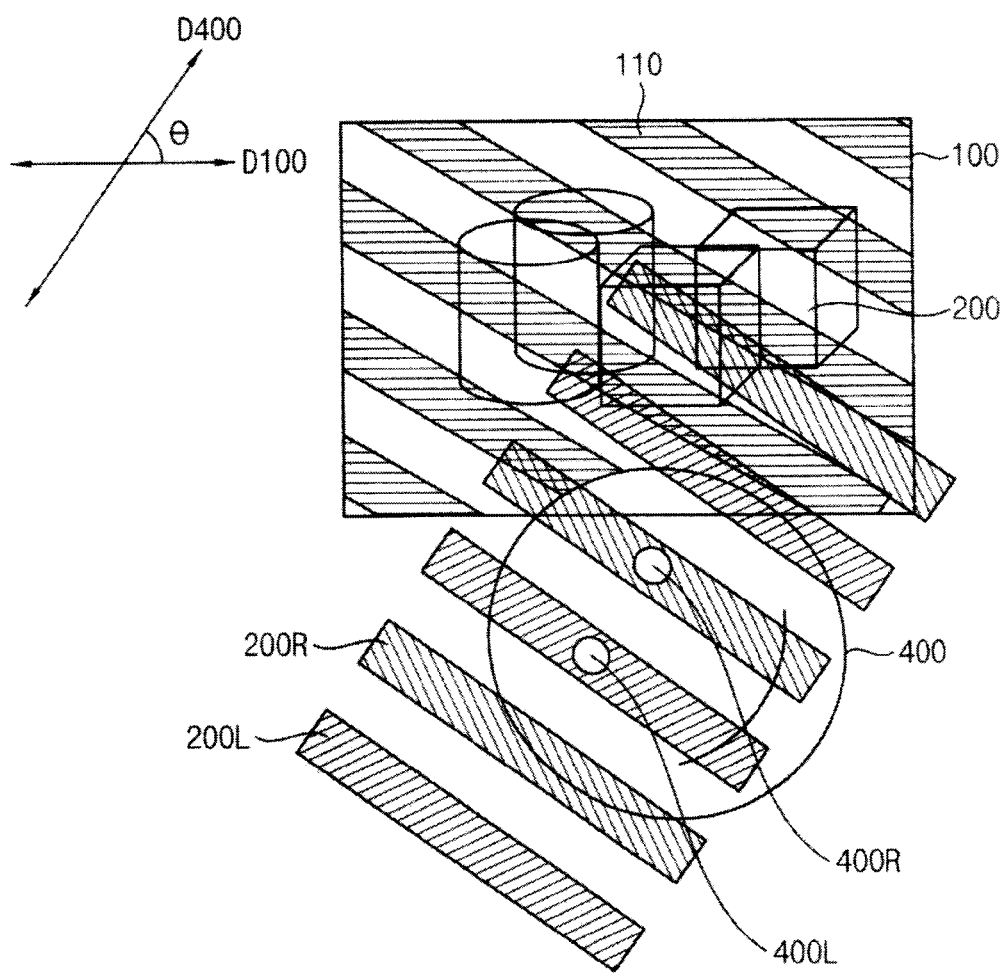
FIG. 5 is a conceptual diagram illustrating an exemplary embodiment of a method of displaying a 3D image according to the invention.

FIG. 5 is a conceptual diagram illustrating an exemplary embodiment of a method of displaying a 3D image according to the invention.

Referring to FIG. 5, in an exemplary embodiment, the method of displaying a 3D image includes using a light converting part, e.g., a barrier panel 110. In such an embodiment, the barrier panel 110 may be disposed on the display panel 100 that displays the image. The barrier panel 110 generates a barrier pattern.

In an exemplary embodiment of the method of displaying a 3D image using the barrier panel 110, the barrier pattern may be inclined corresponding to the relative viewer angle θ determined by the inclined direction D400 of the viewer 400 and the inclined direction D100 of the panel 100 to effectively display the 3D image. In such an embodiment, a left image 200L and a right image 200R are alternately displayed to the viewer 400 along the inclined barrier pattern. A gap between the left image 200L and the right image 200R is substantially equal to the gap between a left eye 400L and a right eye 400R of the viewer 400 such that the left eye 400L and the right eye 400R may view the different images. Thus, the viewer 400 may recognize the 3D image through the left eye 400L and the right eye 400R.

In an exemplary embodiment, the barrier panel 110 includes a plurality of light converting units, e.g., unit barriers, arranged substantially in a matrix form and controls transmission of light provided to a lower surface of the barrier panel 110. In an exemplary embodiment, as shown in FIG. 5, the barrier pattern may include a stripe pattern of the barriers. The barriers extend in a predetermined direction, e.g., the inclined direction of the barrier pattern. The barriers are spaced apart from each other. The barrier panel 110 controls the unit barriers arranged substantially in the matrix form such that that the stripe pattern of barriers may be controlled to have various inclination angles.

In an alternative exemplary embodiment, the barrier panel 110 may generate a circular barrier pattern or a rectangular barrier pattern, for example, to provide various 3D images based on the images to be displayed. In such an embodiment, as described above, the barrier panel 110 controls the barrier units arranged substantially in the matrix form such that various barrier patterns may be effectively generated.

Figure 6A:
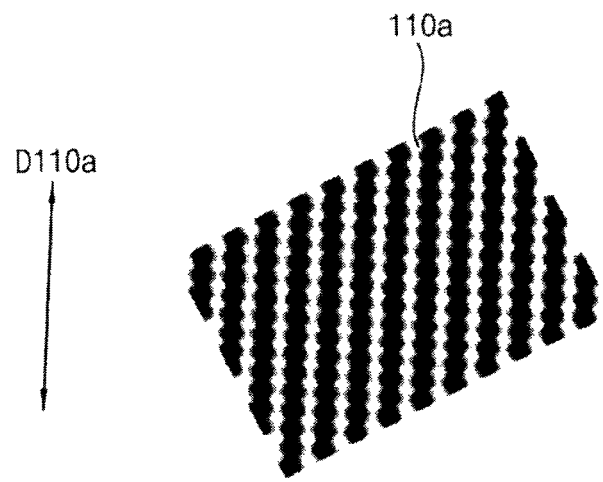
FIGS. 6A to 6C are conceptual diagrams illustrating change of a barrier panel in the method of displaying the 3D image of FIG. 5.
Figure 6B:
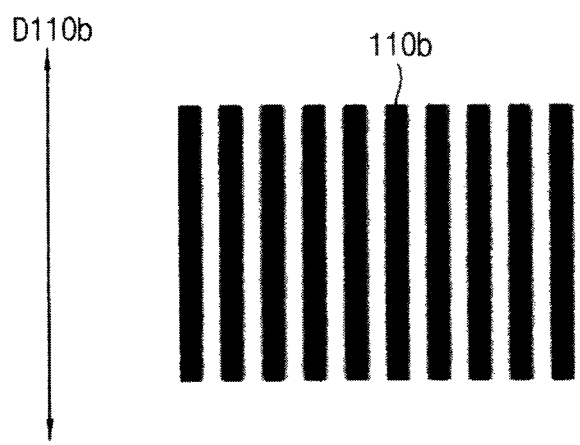
Figure 6C:
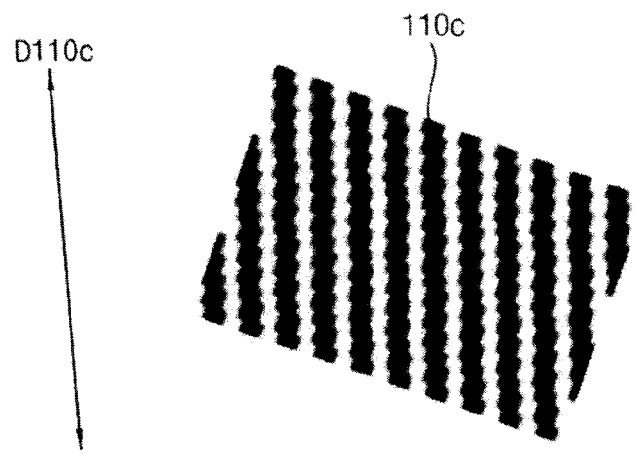

FIGS. 6A to 6C are conceptual diagrams illustrating change of the barrier panel 110 in the method of displaying the 3D image of FIG. 5.

In FIGS. 6A to 6C, the barrier panel 110 generates a plurality of barrier patterns 110a, 110b and 110c, having different inclination angles based on the relative viewer angle θ. In an exemplary embodiment, the barrier patterns 110a, 110b and 110c include stripe patterns that extend in predetermined directions D110a, D110b and D110c based on the relative viewer angle θ. The barrier patterns 110a, 110b and 110c is generated by the barrier units arranged substantially in the matrix form in the barrier panel 110 by independently controlling each barrier unit of the barrier panel 110 to block or transmit light passing therethrough. In such an embodiment, the barrier patterns 110a, 110b and 110c may have various shapes and various directions. In such an embodiment, as the relative viewer angle θ changes, the barrier patterns 110a, 110b and 110c also changes based on the relative viewer angle θ such that the display apparatus may effectively display the 3D image based on the change of the relative viewer angle θ.

Figure 7A:
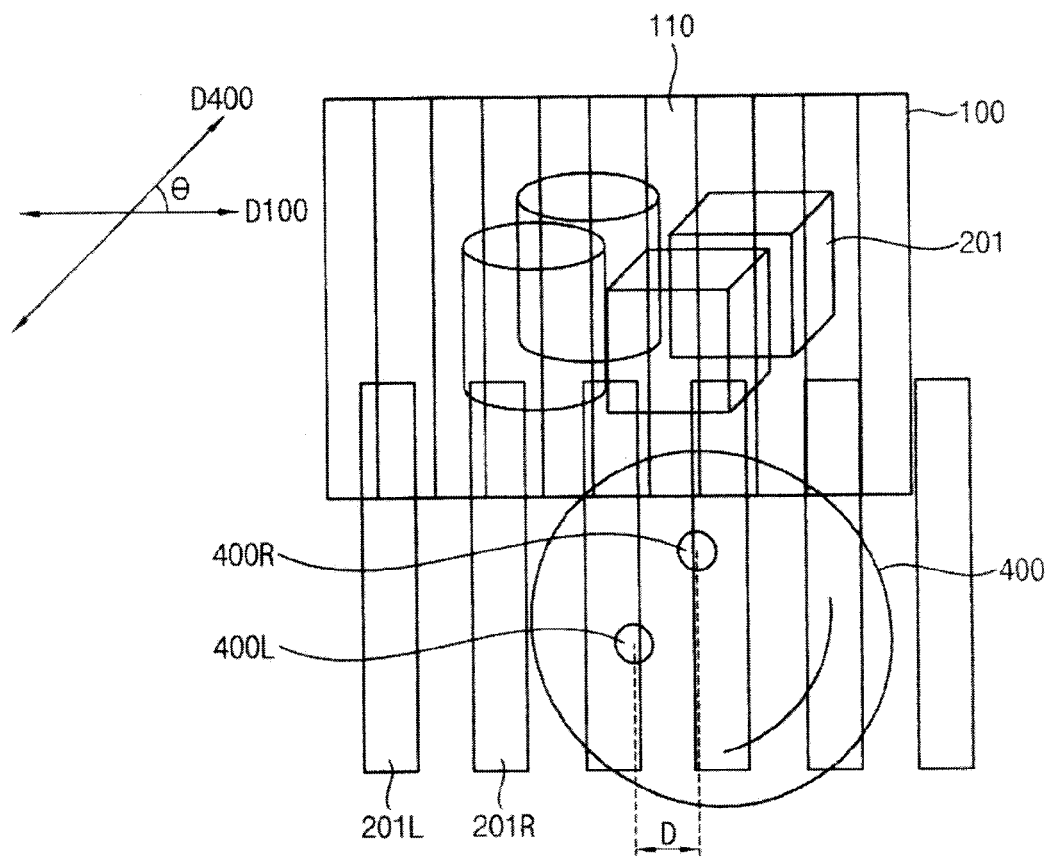
FIGS. 7A to 7B are conceptual diagrams illustrating compensation of the barrier panel in the method of displaying the 3D image of FIG. 5.
Figure 7B:
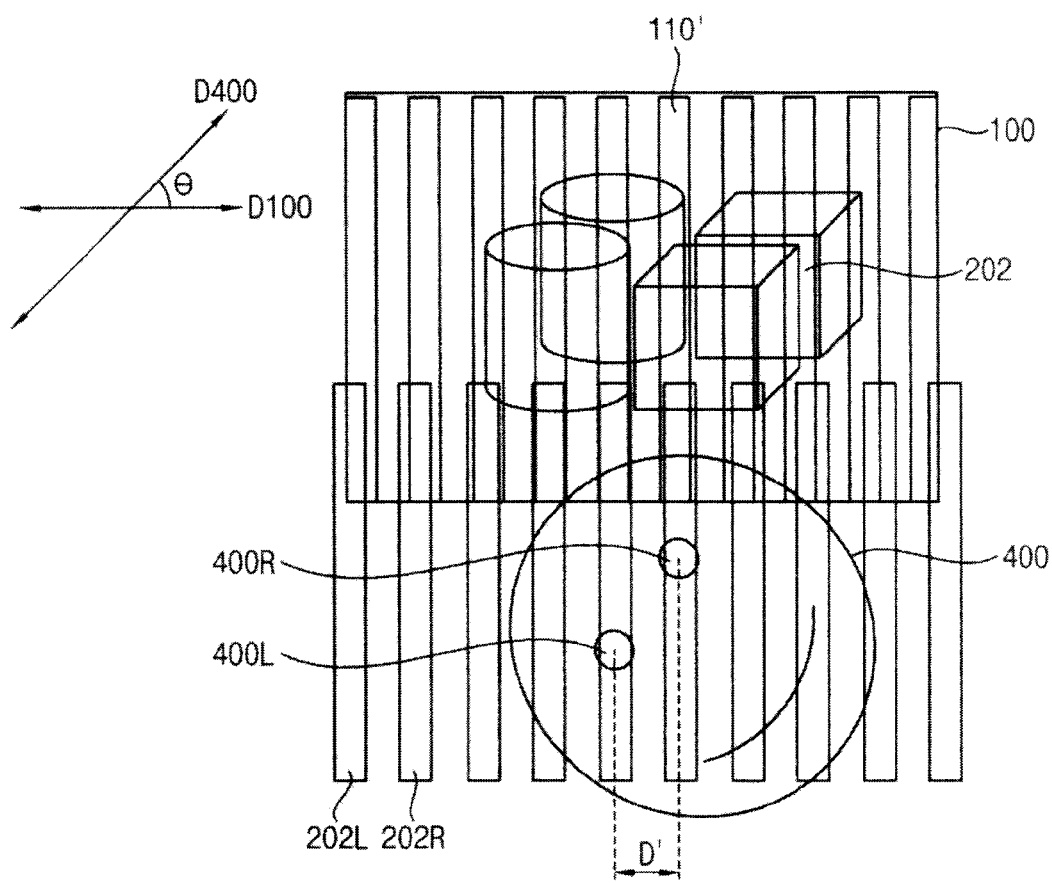

FIGS. 7A to 7B are conceptual diagrams illustrating compensation of the barrier panel 110 in the method of displaying the 3D image of FIG. 5.

Referring to FIG. 7A, a 3D image 201 is transmitted to the viewer 400 from the display panel via the barrier panel 110. The barrier pattern of the barrier panel 110 may be adjusted based on a distance D between the left eye 400L and the right eye 400R of the viewer 400. A gap between an image for the left eye 400L of the viewer 400 and an image for the right eye 400R of the viewer 400 may be adjusted based on a width of the barrier and a gap between adjacent barriers in the barrier pattern.

In an exemplary embodiment, when the viewer 400 is relatively inclined with respect to the panel 100, the distance D between the left eye 400L and the right eye 400R of the viewer 400 in the direction D100 of the panel 100 decreases and, the gap between a left image 201L for the left eye 400L of the viewer 400 and a right image 201R for the right eye 400R of the viewer 400 is adjusted based on the decreased distance D between the left eye 400L and the right eye 400R of the viewer 400. In such an embodiment, the left image 201L may be shown to the left eye 400L of the viewer 400 and the right image 201R may be shown to the right eye 400R of the viewer 400.

In such an embodiment, when the distance D between the left eye 400L and the right eye 400R of the viewer 400 in the direction D100 of the panel 100 changes, the gap between the left image 201L and the right image 201R is adjusted based on the distance D between the left eye 400L and the right eye 400R of the viewer 400 by adjusting the gap between the barriers. When the distance D between the left eye 400L and the right eye 400R of the viewer 400 decreases, the width of the barrier and the gap between adjacent barriers in the barrier pattern also decrease. When the distance D between the left eye 400L and the right eye 400R of the viewer 400 increases, the width of the barrier and the gap between adjacent barriers in the barrier pattern also increase.

The distance D between the left eye 400L and the right eye 400R of the viewer 400 in the direction D100 of the panel 100 may be determined using the relative viewer angle θ. The distance D between the left eye 400L and the right eye 400R of the viewer 400 in the direction D100 of the panel 100 may be determined by applying the relative viewer angle θ to an average distance of two eyes of humans. In an exemplary embodiment, as described above, the width of the barrier and the gap between adjacent barriers may be controlled using the relative viewer angle θ.

Referring to FIG. 7B, as a distance D' between the left eye 400L and the right eye 400R decreases, the width of the barrier 110' and the gap between adjacent barriers 110' in the barrier pattern decrease. The change of the distance D' between the left eye 400L and the right eye 400R may be detected by the relative viewer angle θ. The width of the barrier 110' and the gap between adjacent barriers 110' in the barrier pattern are adjusted using the relative viewer angle θ. Accordingly, the image 202 on the display panel 100 is effectively shown to the left eye 400L and the right eye 400R of the viewer 400. In one exemplary embodiment, for example, as the width of the barrier 110' and the gap between adjacent barriers 110' in the barrier pattern decrease, a cycle of the left image 202L and the right image 202R decreases. In such an embodiment, when the distance D' between the left eye 400L and the right eye 400R decreases, the left image 202L is effectively shown to the left eye 400L of the viewer 400 and the right image 202R is effectively shown to the right eye 400R of the viewer 400.

Figure 8:
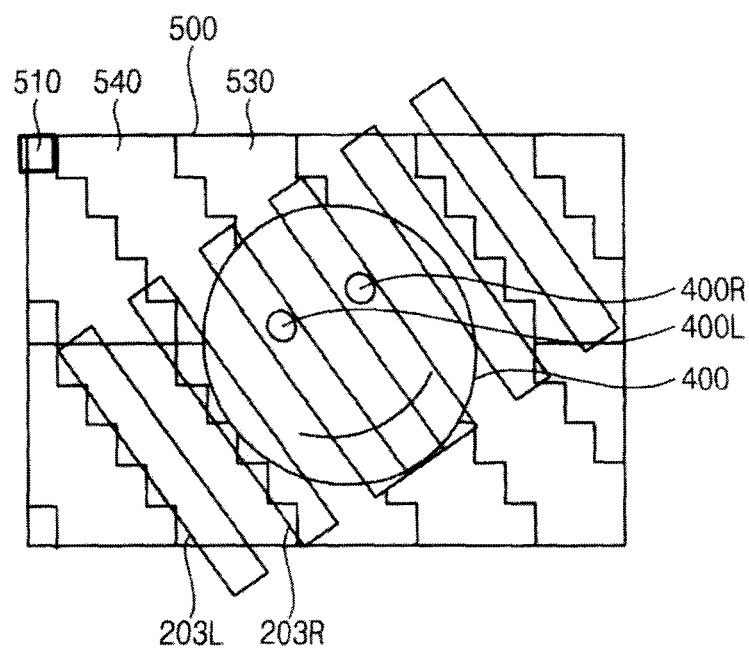
FIG. 8 is a conceptual diagram illustrating an exemplary embodiment of a method of driving a backlight unit in a method of displaying a 3D image according to the invention.

FIG. 8 is a conceptual diagram illustrating an exemplary embodiment of a method of driving a backlight unit in a method of displaying a 3D image according to the invention.

Referring to FIG. 8, a display apparatus that displays a 3D image using an exemplary embodiment of the method of displaying the 3D image includes a light converting part, e.g., a directional backlight unit 500. The directional backlight unit 500 emits light that travels along a light path to viewpoints of the viewer 400. The directional backlight unit 500 includes a plurality of light converting units, e.g., a plurality of backlight portions 510. The backlight portions 510 may be independently driven, such that different images may be provided to the left eye 400L and the right eye 400R of the viewer 400 using the directional backlight unit 500. The backlight portions 510 that are independently driven may be arranged substantially in a matrix form. The directional backlight unit 500 may be driven in an inclined direction corresponding to the relative viewer angle A. The directional backlight unit 500 has a right eye portion 530 that guides light to the right eye 400R of the viewer 400 and a left eye portion 540 that guides light to the left eye 400L of the viewer 400, such that the left image 203L is shown to the left eye 400L of the viewer 400 and the right image 203R is shown to the right eye 400R of the viewer 400.

In an exemplary embodiment, the backlight portions 510 of the directional backlight unit 500 in the matrix form are independently driven corresponding to the relative viewer angle θ such that an inclined 3D image may be displayed when the viewer 400 is inclined with respect to the display panel 100.

Figure 9:
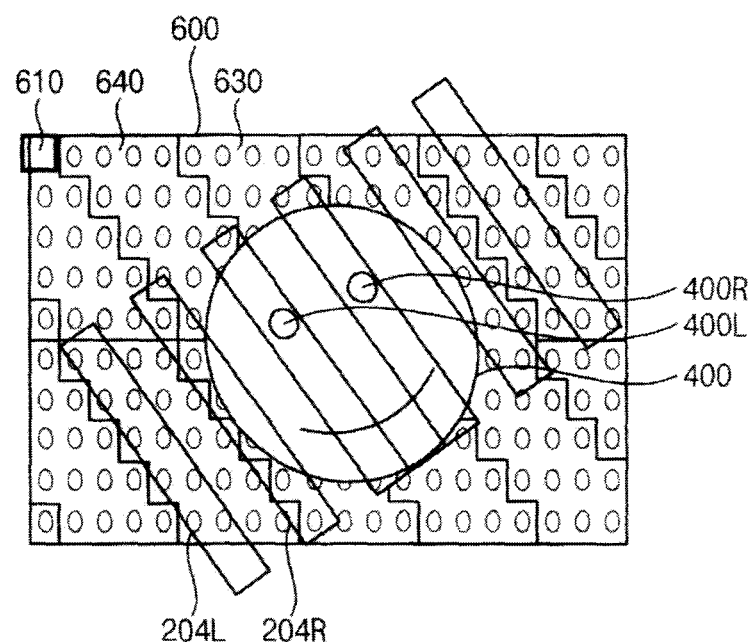
FIG. 9 is a conceptual diagram illustrating an exemplary embodiment of a method of driving a liquid crystal lens in a method of displaying a 3D image according to the invention.

FIG. 9 is a conceptual diagram illustrating an exemplary embodiment of a method of driving a liquid crystal lens in a method of displaying a 3D image according to the invention.

Referring to FIG. 9, an exemplary embodiment of the method of displaying the 3D image may be performed by a display apparatus including a light converting part, e.g., a liquid crystal lens panel 600. The liquid crystal lens panel 600 includes a plurality of light converting units, e.g., a plurality of liquid crystal lenses 610 arranged substantially in a matrix form. A function of the liquid crystal lens panel 600 is substantially similar to a function of the barrier panel 110 in FIG. 5. The barrier panel 110 blocks a portion of the image to provide different images to the left eye 400L and the right eye 400R of the viewer. The liquid crystal lens panel 600 refracts light to provide different images to the left eye 400L and the right eye 400R of the viewer. The liquid crystal lens panel 600 includes a left eye portion 630 that refracts the light to generate the left image 204L and a right eye portion 640 that refracts the light to generate the right image 204R. A pattern of the liquid crystal lenses 610 is generated corresponding to the relative viewer angle θ.

The liquid crystal lenses 610 in the matrix form of the liquid crystal lens panel 600 may be controlled based on the relative viewer angle θ such that the 3D image is effectively displayed when the viewer 400 is inclined with respect to the display panel 100.

FIGS. 10A to 10D are conceptual diagrams illustrating compensation of a 3D image in an exemplary embodiment of a method of displaying a 3D image according to the invention.

The 3D image is displayed using a difference between a left image for the left eye 400L of the viewer 400 and a right image for the right eye 400R of the viewer 400. The display apparatus for the 3D image displays an image of an object shown to the left eye 400L and an image of the object shown to the right eye 400R of the viewer 400. Thus, the left image and the right image are spaced apart from each other in a direction substantially parallel to a line connecting the left eye 400L and the right eye 400R of the viewer 400.

The method of displaying a 3D image may further include determining an image source. In one exemplary embodiment, for example, the image source may be one of a stereo camera image, a 2D image and a 3D rendering image.

In an exemplary embodiment, when the image source is the stereo camera image, the image source includes a first camera image corresponding to the left image for the left eye 400L of the viewer 400 and a second camera image corresponding to the right image for the right eye 400R of the viewer 400.

In an exemplary embodiment, when the image source is the stereo camera image, an image processor rearranges the first camera image and the second camera image corresponding to the relative viewer angle θ to display the 3D image.

In an exemplary, when the image source is the 2D image, the image source is a single image. The single 2D image is converted into a left image for the left eye 400L of the viewer 400 and a right image for the right eye 400R of the viewer 400 to display the 3D image.

In an exemplary embodiment, when the image source is the 2D image, an image processor generates the left image and the right image corresponding to the relative viewer angle θ to display the 3D image.

The 3D rendering image includes a plurality of images for a plurality of viewpoints. Thus, the 3D rendering image includes more information compared to the 2D image.

In an exemplary embodiment, when the image source is the 3D rendering image, the image source may provide various images according to a position of the viewer 400 with respect to the display panel 100.

When the image source is the 3D rendering image, an image processor compensates the 3D rendering image according to the position of the viewer 400 and generates a position-compensated 3D rendering image. In one exemplary embodiment, for example, the image processor may adjust a coordinate of the image according to the position of the viewer 400. The image processor converts the position-compensated 3D rendering image into the left image to be displayed to the left eye 400L of the viewer 400 and the right image to be displayed to the right eye 400R of the viewer 400. The image processor generates the left image and the right image corresponding to the relative viewer angle θ to display the 3D image.

Figure 10A:
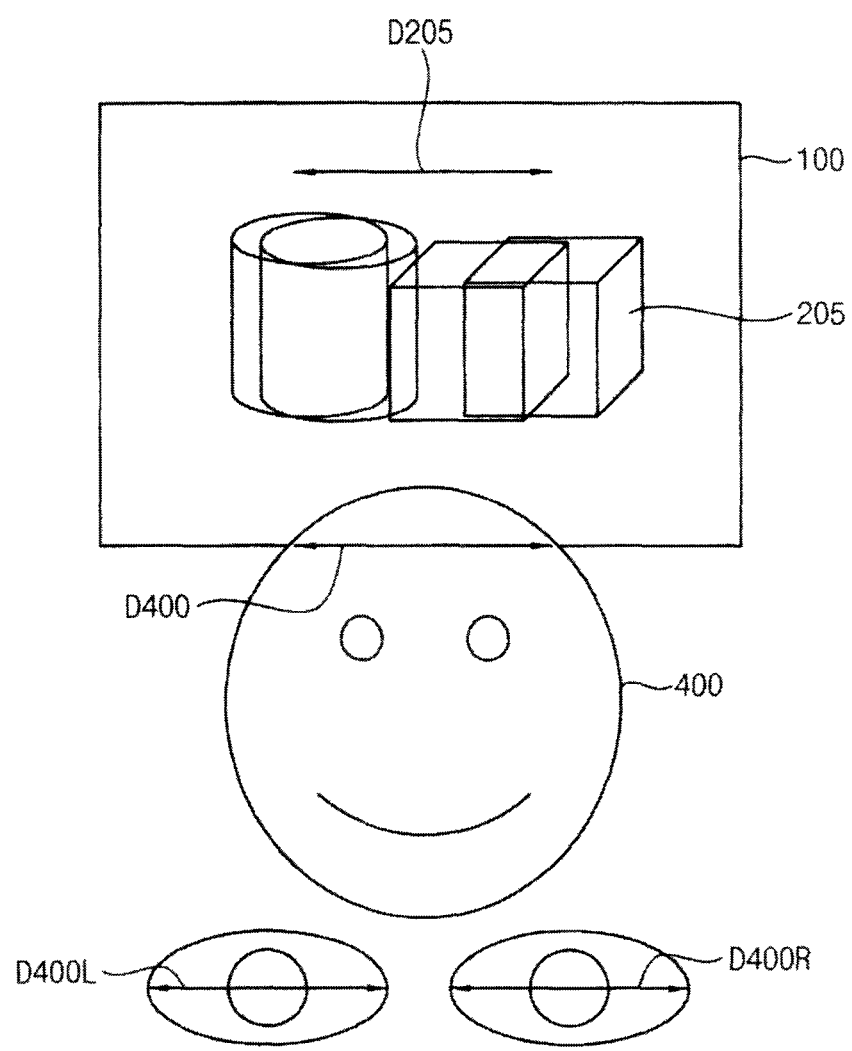
FIGS. 10A to 10D are conceptual diagrams illustrating compensation of a 3D image in an exemplary embodiment of a method of displaying a 3D image according to the invention.

Referring to FIG. 10A, when the left eye 400L and the right eye 400R of the viewer 400 has a viewer direction D400, images 205 are disposed in an image direction D205. Eyeballs of the left eye 400L and the right eye 400R may move in a lateral direction D400L and D400R rather than a vertical direction such that the images 205 are spaced apart from each other in the image direction D205. The image direction D205 of the images 205 may be compensated based on the relative viewer angle θ. In one exemplary embodiment, for example, the left image and the right image for the viewer 400 may be spaced apart from each other in a direction corresponding to the relative viewer angle θ.

Figure 10B:
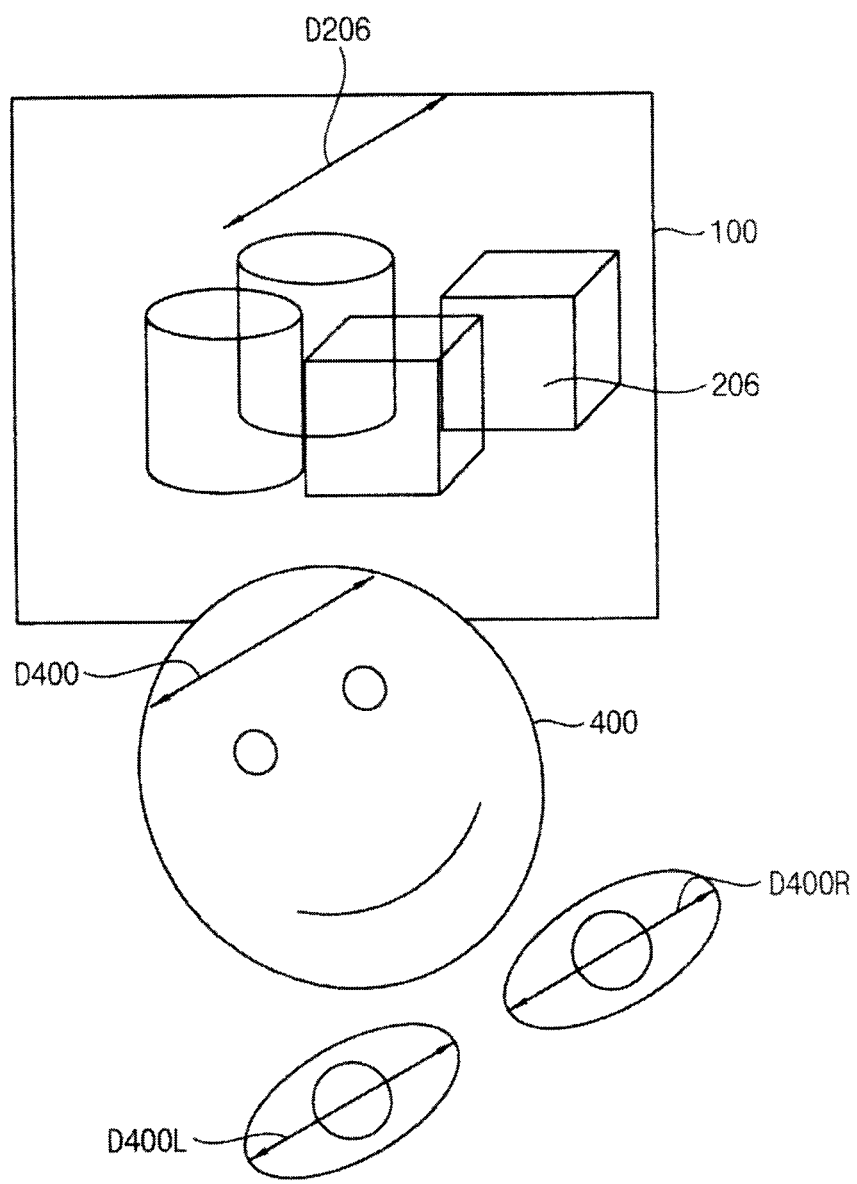

Referring to FIG. 10B, the panel 100 may not be inclined, but the viewer 400 may be inclined in a viewer direction D400. Images 206 are compensated in a compensation direction D206. The compensation direction 206 is determined based on the relative viewer angle θ. The left image and the right image in the images 206 are compensated in the compensation direction D206 based on the relative viewer angle θ.

Figure 10C:
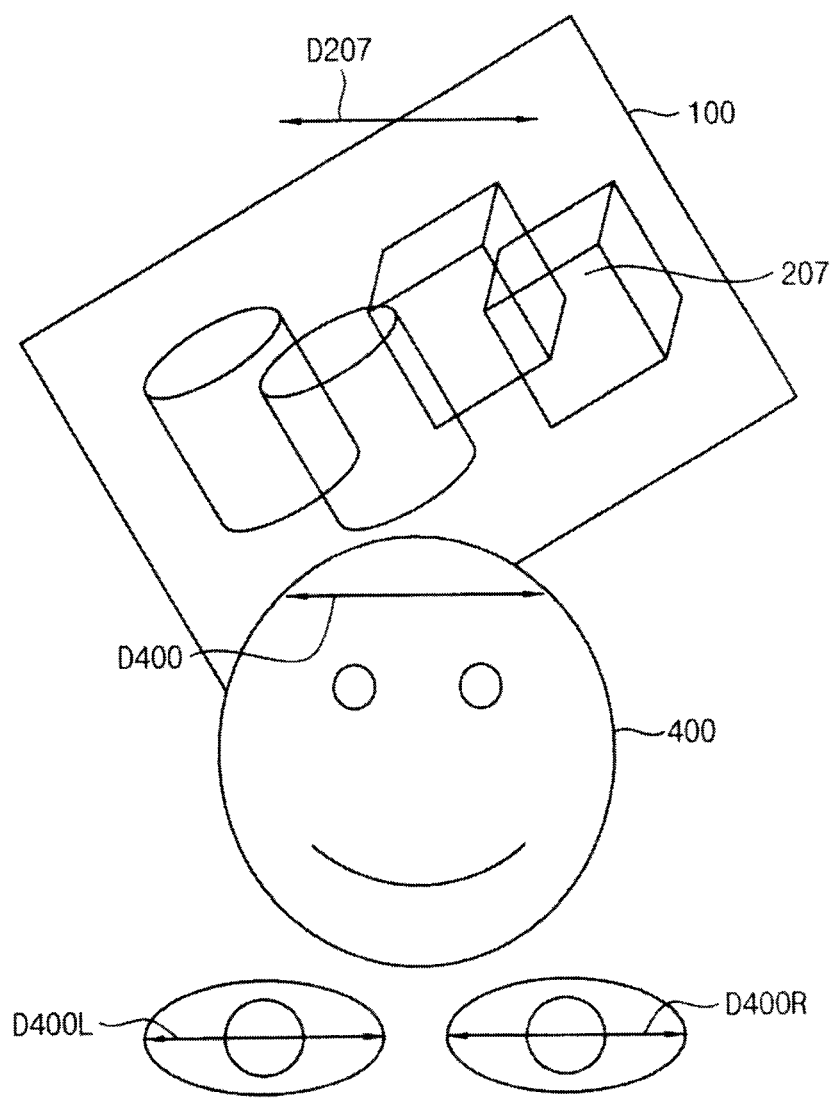

Referring to FIG. 10C, the viewer 400 may not be inclined, but the panel 100 may be inclined. Images 207 are compensated in a compensation direction D207. The compensation direction 207 is determined based on the relative viewer angle θ.

Figure 10D:
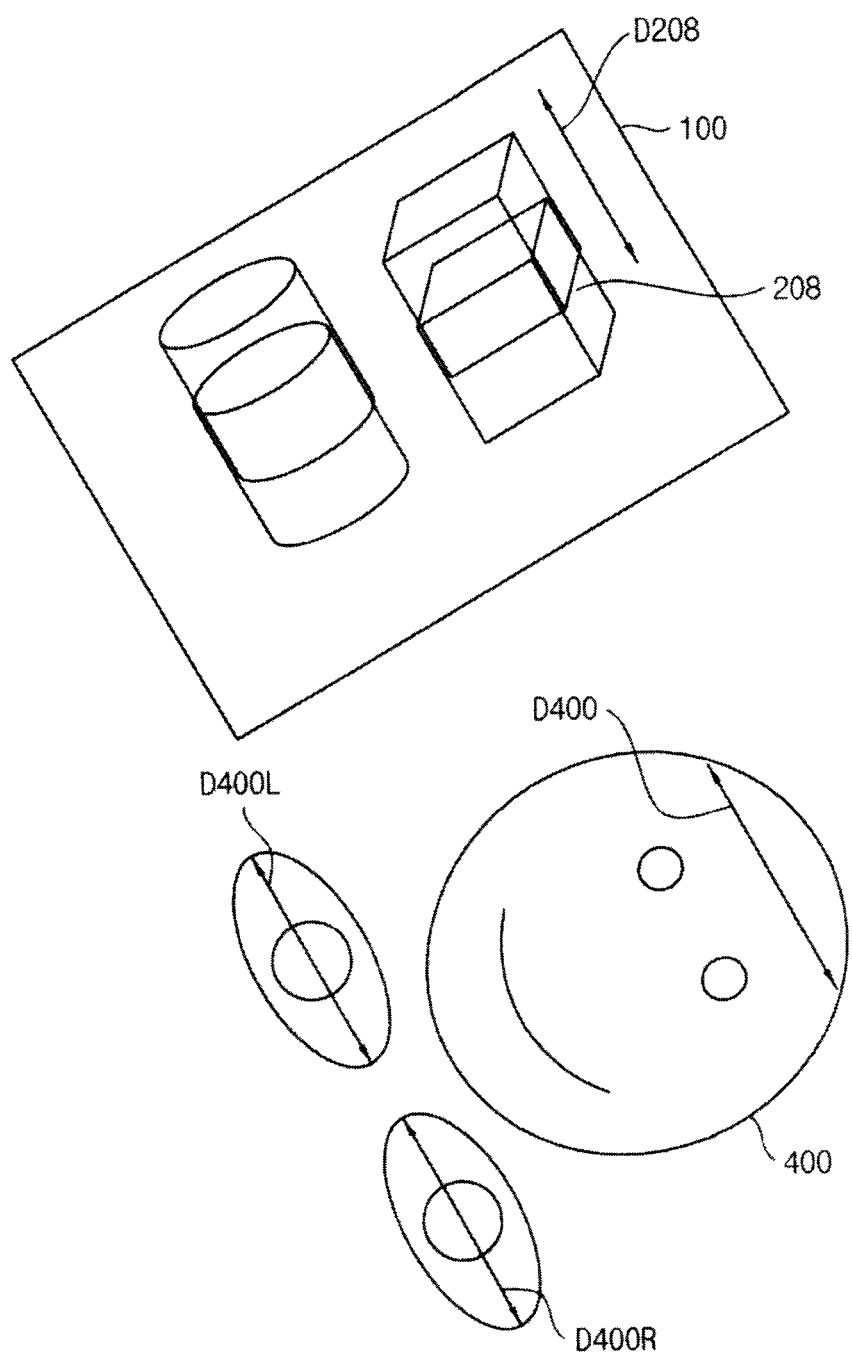

Referring to FIG. 10D, each of the viewer 400 and the panel 100 may be inclined. In FIG. 10D, the viewer 400 is inclined in a first direction with respect to a direction of gravity, and the panel 100 is inclined in a second direction with respect to the direction of gravity. Images 208 are compensated in a compensation direction D208. The compensation direction D208 is determined based on the relative viewer angle θ.

As shown in FIG. 10D, the viewer 400 and the panel 100 may be inclined in opposite directions, but not being limited thereto. The viewer 400 and the panel 100 may be inclined in a same direction.

As shown in FIGS. 10B and 10C, the viewer 400 and the panel 100 may be inclined in different angles, but not being limited thereto. The viewer 400 and the panel 100 may be inclined in a same angle. In one exemplary embodiment, for example, when the viewer 400 and the panel 100 are inclined in the same angle, the relative viewer angle θ is about zero such that the images 208 in the panel 100 may not be compensated.

Figure 11A:
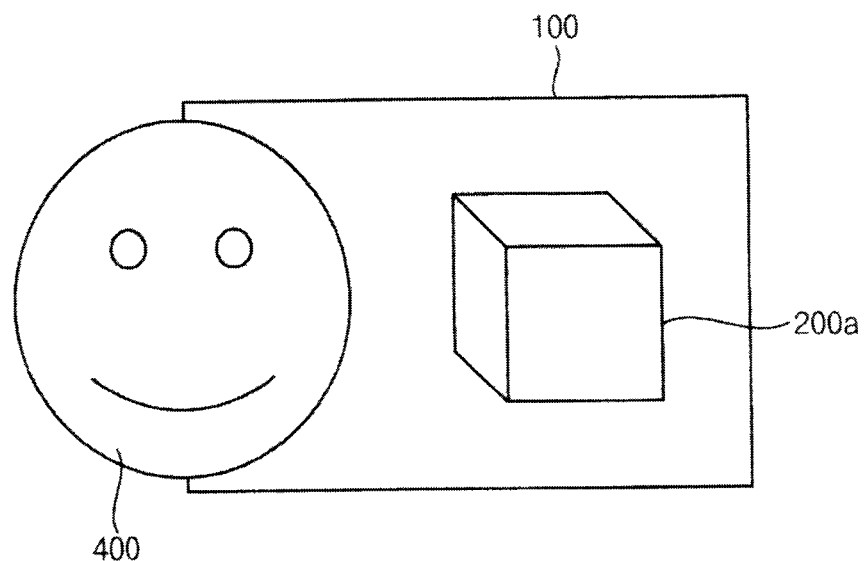
FIGS. 11A to 11C are conceptual diagrams illustrating compensation of a 3D image in an exemplary embodiment of a method of displaying a 3D image according to the invention.
Figure 11B:
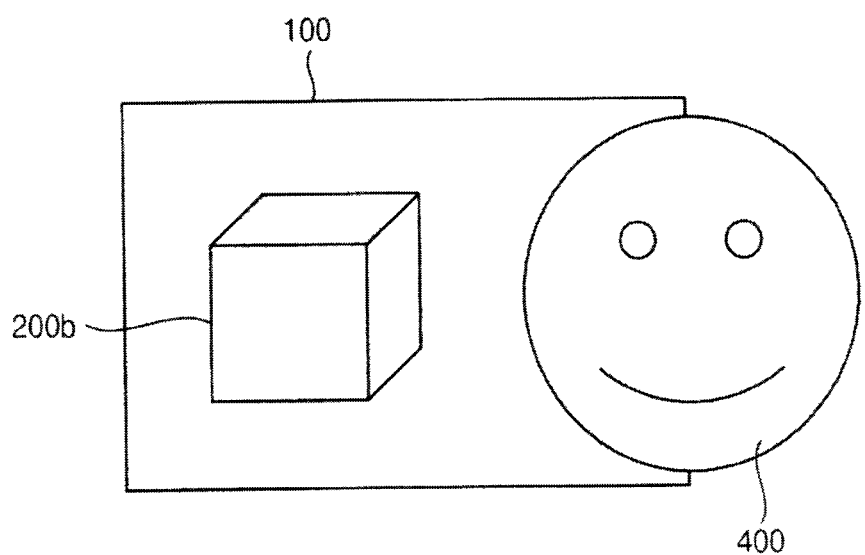
Figure 11C:
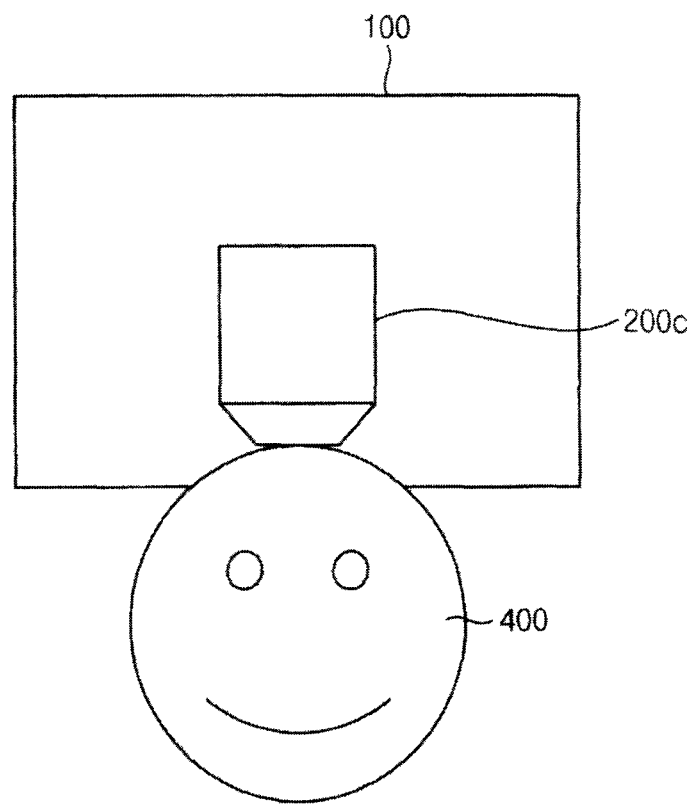

FIGS. 11A to 11C are conceptual diagrams illustrating compensation of a 3D image in an exemplary embodiment of a method of displaying a 3D image according to the invention.

In an exemplary embodiment, as shown in FIGS. 11A to 11C, the image source may be the 3D rendering image. The compensation of the 3D image in such an embodiment is operated based on a relative position of the viewer 400 with respect to the panel 100. In such an embodiment, the relative position of the viewer 400 with respect to the panel 100 is detected. The 3D images 200a, 200b and 200c are compensated based on the relative position of the viewer 400. A portion of an object shown to the viewer 400 is reconstructed based on the relative position of the viewer 400 by a data converting method.

Referring to FIG. 11A, the viewer 400 may be at a left side with respect to the panel 100. When the viewer 400 is at the left side with respect to the panel 100, the viewer 400 may further view a left portion of the object. Accordingly, the compensated image 200a further includes the left portion of the object. The 3D rendering image includes various data corresponding to various relative positions of the viewer 400 such that the image may be reconstructed based on the relative position of the viewer 400. The compensated image 200a may include a portion which is not shown to a front view at a central portion of the panel 100. The 3D rendering image includes additional data compared to a conventional 2D image. The 3D rendering image may include a left side image, a right side image, an upper side image and a lower side image.

Referring to FIG. 11B, the viewer 400 may be at a right side with respect to the panel 100. When the viewer 400 is at the right side with respect to the panel 100, the viewer 400 may further view a right portion of the object. Accordingly, the compensated image 200b further includes the right portion of the object.

Referring to FIG. 11C, the viewer 400 may be at a lower side with respect to the panel 100. When the viewer 400 is at the lower side with respect to the panel 100, the viewer 400 may further view a lower portion of the object. Accordingly, the compensated image 200b further includes the lower portion of the object.

Figure 12A:
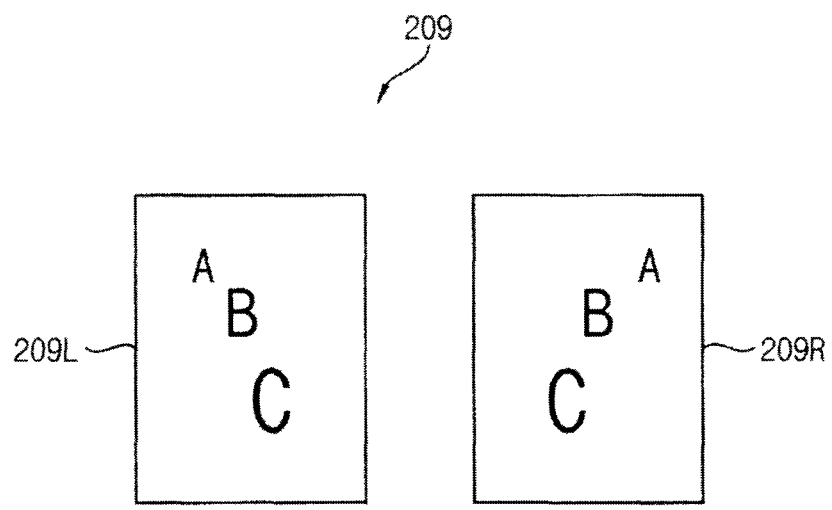
FIGS. 12A and 12B are conceptual diagrams illustrating a concept of an exemplary embodiment of a method for displaying a 3D image according to an exemplary embodiment of the invention.
Figure 12B:
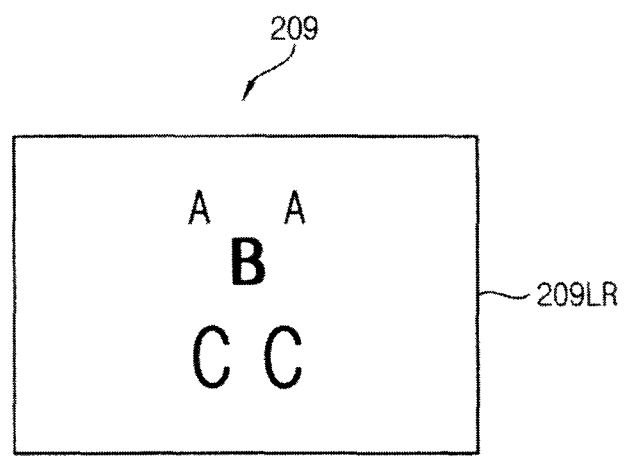

FIGS. 12A and 12B are conceptual diagrams illustrating a concept of an exemplary embodiment of a method for displaying a 3D image according to the invention.

Referring to FIGS. 12A and 12B, a 3D image 209 includes a left image 209L and a right image 209R. When the viewer views an object in a position using a left eye and a right eye, a viewpoint of the left eye and a viewpoint of the right eye are different from each other such that different images are shown to the left eye and the right eye. In one exemplary embodiment, for example, a difference of images of an object in a long distance for the left eye and the right eye may be less than a difference of images of an object in a short distance for the left eye and the right eye. In an exemplary embodiment, the left image 209L and the right image 209R are prepared and a combined image 209LR of the left image 209L and the right image 209R is outputted to the viewer such that the viewer recognizes the 3D image. A distance between eyeballs of the viewer may be detected and the image data may be adjusted based on the distance between the eyeballs of the viewer. In such an embodiment, the left image 209L and the right image 209R are viewed to the left eye and the right eye of the viewer, respectively, when the combined image 209LR which includes overlapping images as shown in FIG. 12B is displayed.

Figure 13A:
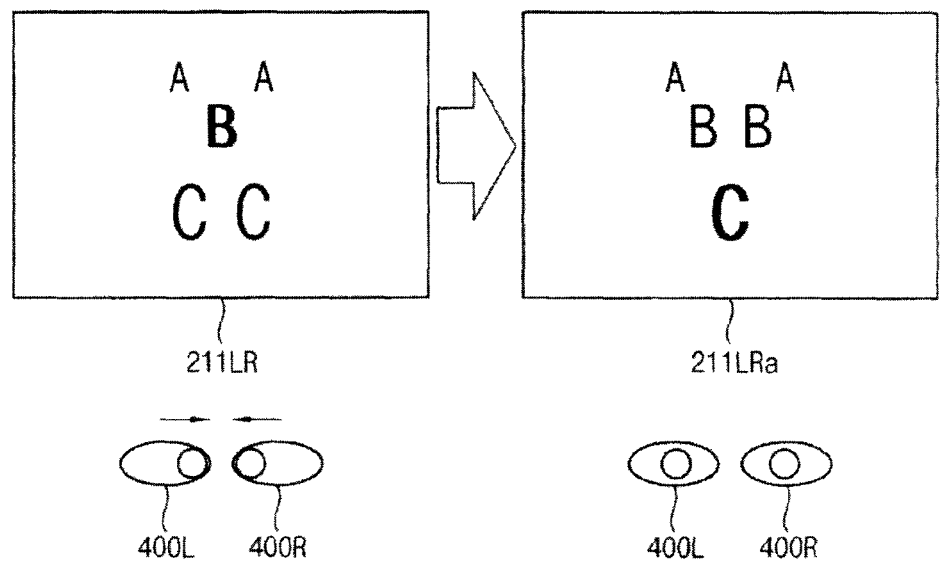
FIGS. 13A to 13C are conceptual diagrams illustrating compensation of a 3D image in an exemplary embodiment of a method of displaying a 3D image according to the invention.
Figure 13B:
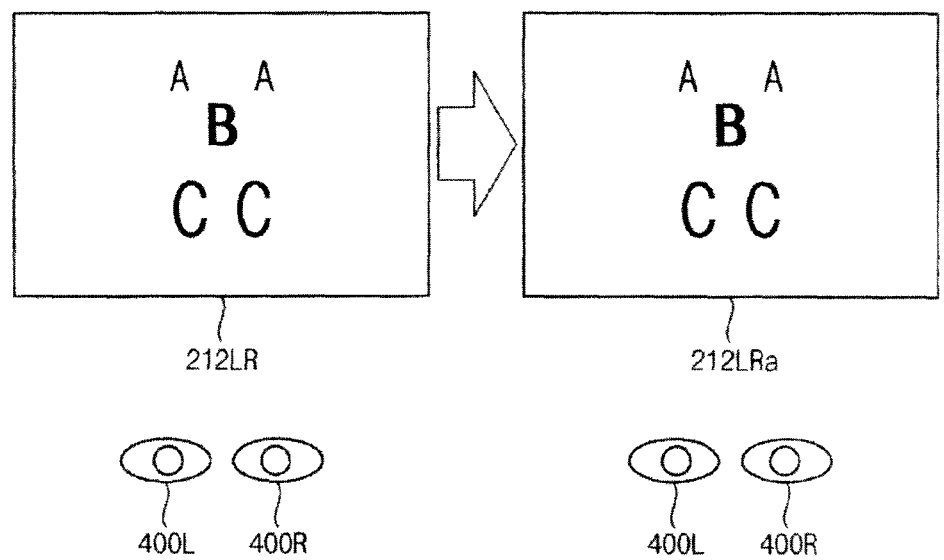
Figure 13C:
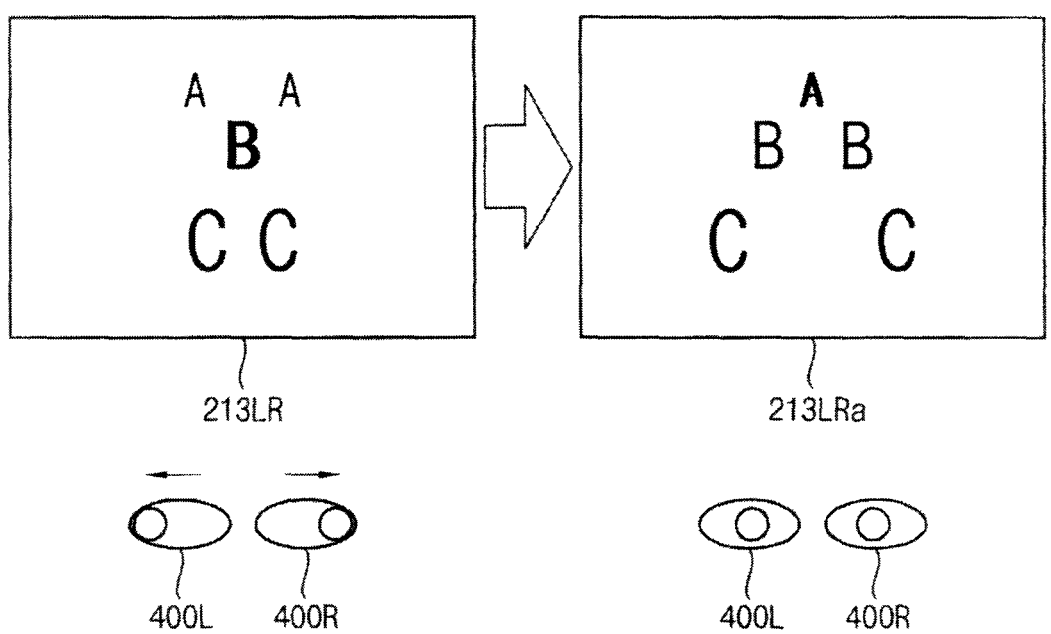

FIGS. 13A to 13C are conceptual diagrams illustrating compensation of a 3D image in an exemplary embodiment of a method of displaying a 3D image according to the invention.

Referring to FIG. 13A, when the viewer views a close image, e.g., 'C', the eyeballs of the viewer moves close to each other. The eyeballs of the viewer moves close to each other to view the close image unconsciously but the close positions of the eyeballs may not be maintained for a long time due to eye fatigue of the viewer. In an exemplary embodiment, the distance between the eyeballs of the viewer may be measured and the image data may be adjusted to effectively prevent or substantially alleviate the eye fatigue based on the distance between the eyeballs of the viewer to recognize the 3D image in a convenient circumstance.

Referring again to FIG. 13A, the viewer concentrates the eyeballs of two eyes toward a central portion to view a close image, e.g. 'C'. When the distance of the eyeballs is less than a predetermined distance, e.g., an ordinary distance of the eyeballs, left and right images of the close image C in the 3D image data 211LR is compensated to overlap each other. Thus, the compensated image 211LRa which includes the overlapping left and right images of the close image C is outputted such that the viewer may view the close image C with the ordinary distance of the eyeballs.

Referring to FIG. 13B, in an exemplary embodiment, when the viewer views a middle image or a central image, e.g., 'B', the distance of the eyeballs is maintained in the ordinary distance such that the 3D image data are not be compensated. In one embodiment, for example, when the viewer views the middle image or the central image, e.g., 'B', the 3D image data 212LR may be substantially the same as a compensated image 212LRa.

Referring to FIG. 13C, the viewer may space the eyeballs of two eyes apart from each other compared to an ordinary distance of the eyeballs to view a far image, e.g., 'A'. However, the positions of the eyeballs may not be effectively spaced apart from each other by the viewer. In an exemplary embodiment, when the distance of the eyeballs is greater than the ordinary distance of the eyeballs, the image data may be compensated compared to when the distance of the eyeballs is less than the ordinary distance of the eyeballs. In such an embodiment, when the distance of the eyeballs is greater than the ordinary distance of the eyeballs, left and right images of the far image, e.g., 'A' in the 3D image data 213LR may be compensated to overlap each other. Thus, the compensated image 213LRa which has the overlapping left and right images of the far image, e.g., 'A' is outputted such that the viewer may view the far image, e.g., 'A' with the ordinary distance of the eyeballs.

Figure 14A:
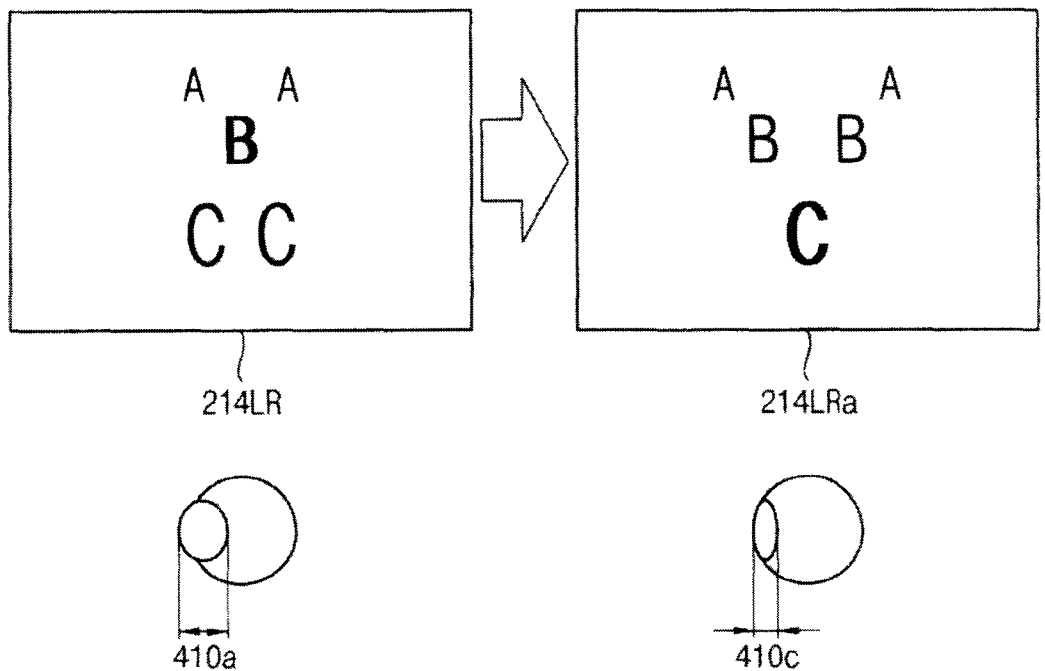
FIGS. 14A and 14B are conceptual diagrams illustrating compensation of a 3D image in an exemplary embodiment of a method of displaying a 3D image according to the invention.
Figure 14B:
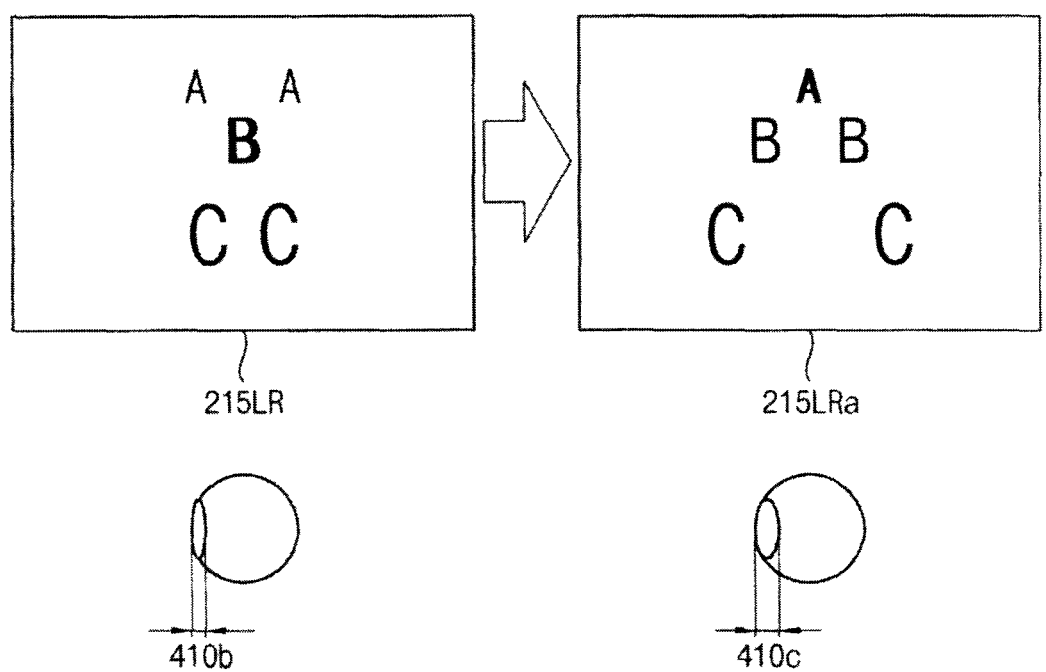

FIGS. 14A and 14B are conceptual diagrams illustrating compensation of a 3D image in an exemplary embodiment of a method of displaying a 3D image according to the invention.

According to an exemplary embodiment, as shown in FIGS. 14A and 14B, the image may be compensated based on a thickness of a crystalline lens of the viewer. When the viewer views a close image or a far image, the thickness of the crystalline lens of the viewer varies. In a similarly way to the exemplary embodiment of FIGS. 13A to 13C, the thickness of the crystalline lens of the viewer may be changed unconsciously to view the close image or the far image such that eye fatigue may occur. When the viewer views view the close image or the far image, the 3D image is compensated to effectively prevent or substantially alleviate the eye fatigue such that the viewer may recognize the 3D image in a convenient circumstance.

Referring to FIG. 14A, a thickness 410a of the crystalline lens of the viewer may be greater than a predetermined thickness, e.g., an ordinary thickness 410c of the crystalline lens of the viewer to view a close image, e.g., 'C'. When the thickness 410a of the crystalline lens of the viewer is greater than the ordinary thickness 410c of the crystalline lens of the viewer, left and right images of the close image, e.g., 'C' in the 3D image data 214LR are compensated to overlap each other. Thus, the compensated image 214LRa including overlapping left and right images of the close image, e.g., 'C' is outputted such that the viewer may view the close image C with the ordinary thickness 410c of the crystalline lens.

Referring to FIG. 14B, a thickness 410b of the crystalline lens of the viewer may be less than the ordinary thickness 410c of the crystalline lens of the viewer to view a far image, e.g., 'A'. When the thickness 410b of the crystalline lens of the viewer is less than the ordinary thickness 410c of the crystalline lens of the viewer, left and right images of the far image, e.g., 'A' in the 3D image data 215LR are compensated to overlap each other. Thus, the compensated image 215LRa which has the overlapped left and right images of the far image, e.g., 'A' is outputted such that the viewer may view the far image A with the ordinary thickness 410c of the crystalline lens.

Figure 15:
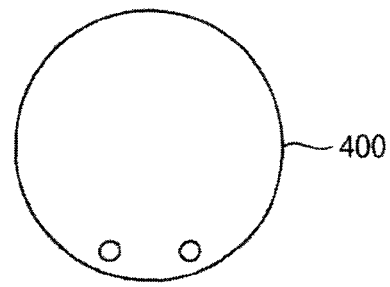
FIG. 15 is a conceptual diagram illustrating an exemplary embodiment of a 3D image display apparatus according to the invention.
Figure 15:
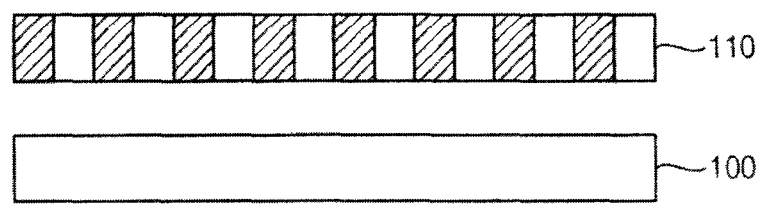

FIG. 15 is a conceptual diagram illustrating an exemplary embodiment of a 3D image display apparatus according to the invention.

Referring to FIG. 15, an exemplary embodiment of the 3D image display apparatus includes a panel 100 and a barrier panel 110. The panel 100 includes a plurality of pixels arranged substantially in a matrix form. The panel 100 displays an image using the pixels. The barrier panel 110 is disposed on the panel 100. The barrier panel 110 selectively transmits and blocks the image on the panel 100 to transmit the image on the panel 100 to eyes of the viewer 400.

In one exemplary embodiment, for example, the panel 100 and the barrier panel 110 are driven in a time division driving method. In a first subframe of a frame, the panel 100 displays a left image and the barrier panel 110 has a first transmission state to guide the image on the panel 100 to a left eye of the viewer 400. In a second subframe of the frame, the panel 100 displays a right image and the barrier panel 110 has a second transmission state to guide the image on the panel 100 to a right eye of the viewer 400.

Figure 16A:
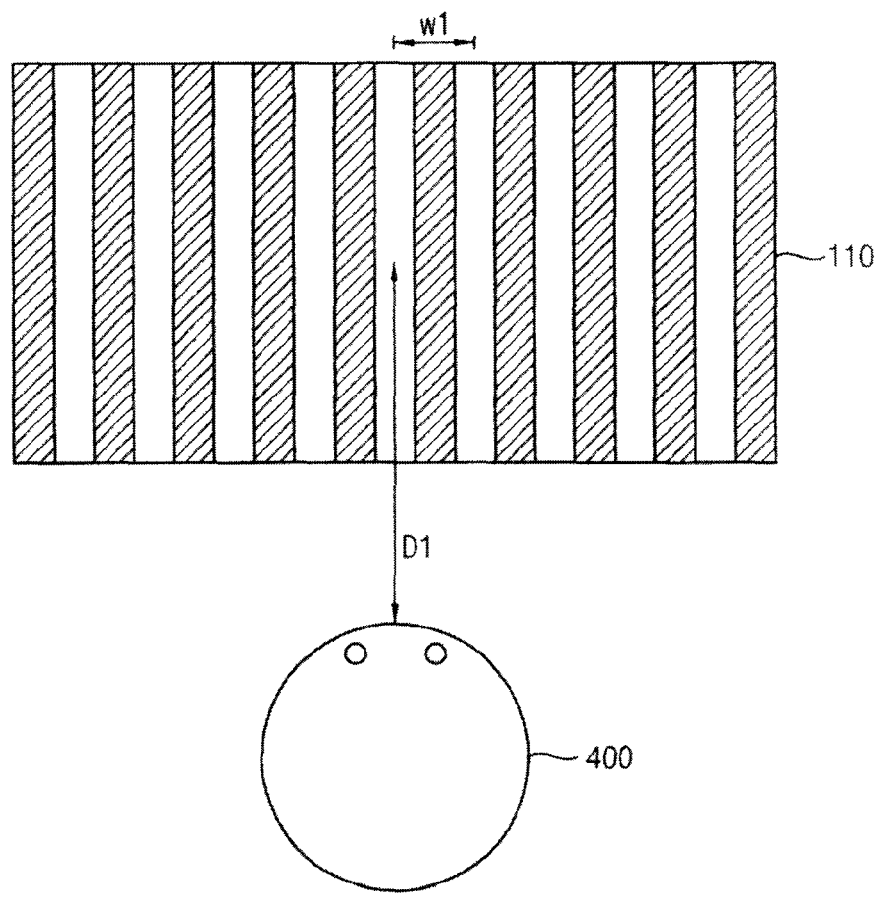
FIGS. 16A and 16B are conceptual diagrams illustrating an exemplary embodiment of a method of driving a barrier panel of FIG. 15 based on a distance of a viewer from the panel.
Figure 16B:
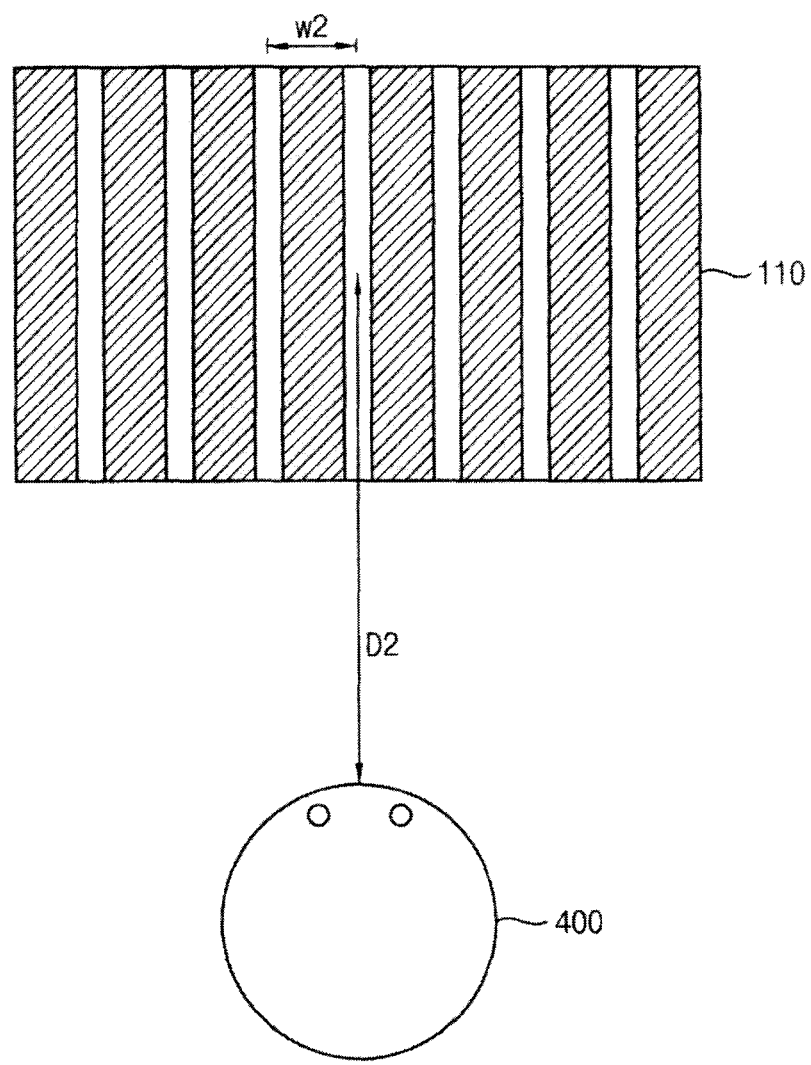
Figure 17:
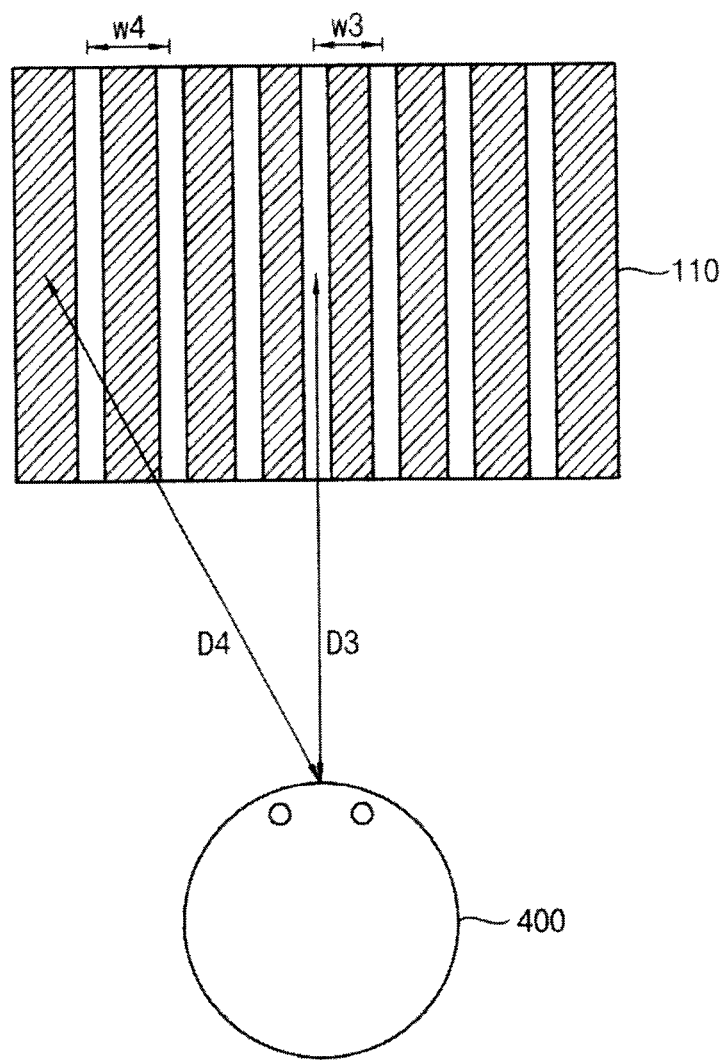
FIG. 17 is a conceptual diagram illustrating an exemplary embodiment of a method of driving the barrier panel of FIG. 15 based on a distance of the viewer from a pixel.

FIGS. 16A and 16B are conceptual diagrams illustrating an exemplary embodiment of a method of driving a barrier panel of FIG. 15 based on a distance of a viewer 400 from the panel. FIG. 17 is a conceptual diagram illustrating an exemplary embodiment of a method of driving the barrier panel of FIG. 15 based on a distance of the viewer 400 from a pixel. In such an embodiment, as described above, the barrier panel 110 has a plurality of barrier units arranged substantially in a matrix form such that the barrier panel 110 may generates various patterns. In an exemplary embodiment, as shown in FIG. 16A, the barrier panel 100 has a stripe pattern. The inclined stripe pattern of the barrier panel 100 is described above referring to FIGS. 6A to 6C.

Referring to FIGS. 15 to 17, an exemplary embodiment, the barrier pattern may be adjusted abased on a distance of the viewer 400 from the panel 100. In such an embodiment, the barrier pattern may be adjusted based on a distance of the viewer 400 from the barrier panel 110. The panel 100 and the barrier panel 110 are disposed substantially close to each other such that the distance of the viewer 400 from the panel 100 and the distance of the viewer 400 from the barrier panel 110 are substantially similar to each other.

In one exemplary embodiment, for example, when the distance of the viewer 400 from the panel 100 increases, a gap between adjacent transmitting areas of the barrier pattern may be increased.

In FIG. 16A, when the viewer 400 is in a position with a first distance D1 from the panel 100, the transmitting areas of the barrier pattern may have a first gap w1. In FIG. 16B, when the viewer 400 is in a position with a second distance D2, which is greater than the first distance D1, from the panel 100, the transmitting areas of the barrier pattern may have a second gap w2 greater than the first gap w1.

In an exemplary embodiment, the barrier pattern may be adjusted based on a distance of the viewer 400 from a pixel of the panel 100. In one exemplary embodiment, for example, when the distance of the viewer 400 from the pixel of the panel 100 increases, a gap between adjacent transmitting areas of the barrier pattern may be increased.

In FIG. 17, when the viewer 400 may be in a position with a third distance D3 from a pixel in a central portion of the panel 100, the transmitting areas of the barrier pattern in the central portion of the barrier panel 110 may have a third gap w3. When the viewer 400 may be in the position with a fourth distance D4, which is greater than third distance D3, from a pixel in an edge portion of the panel 100, the transmitting areas of the barrier pattern in an edge portion of the barrier panel 110 may have a fourth gap w4 greater than the third gap w3.

Figure 18A:
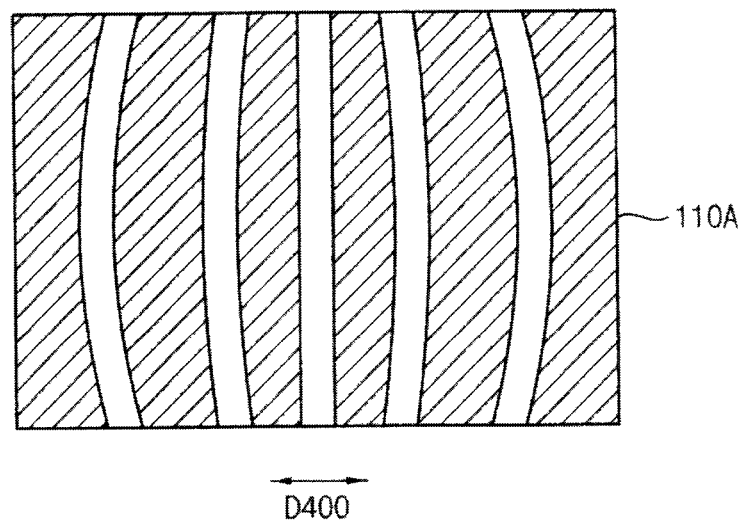
FIGS. 18A and 18B are conceptual diagrams illustrating an exemplary embodiment of a method of driving a barrier panel based on a relative viewer angle according to the invention.
Figure 18B:
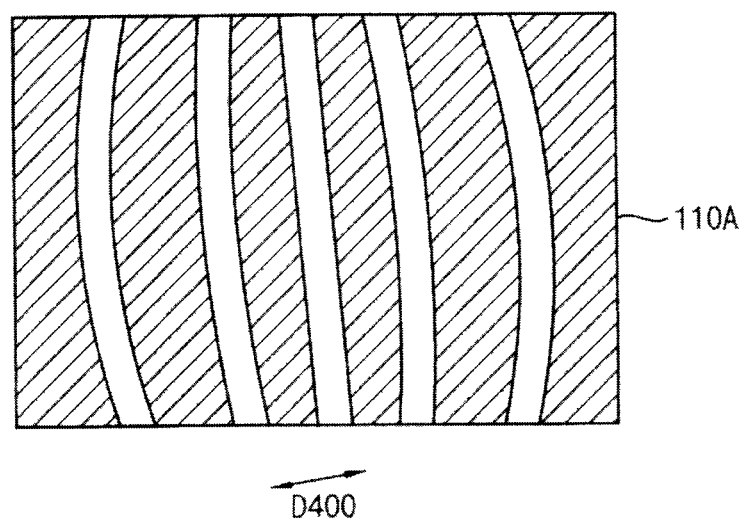
Figure 19A:
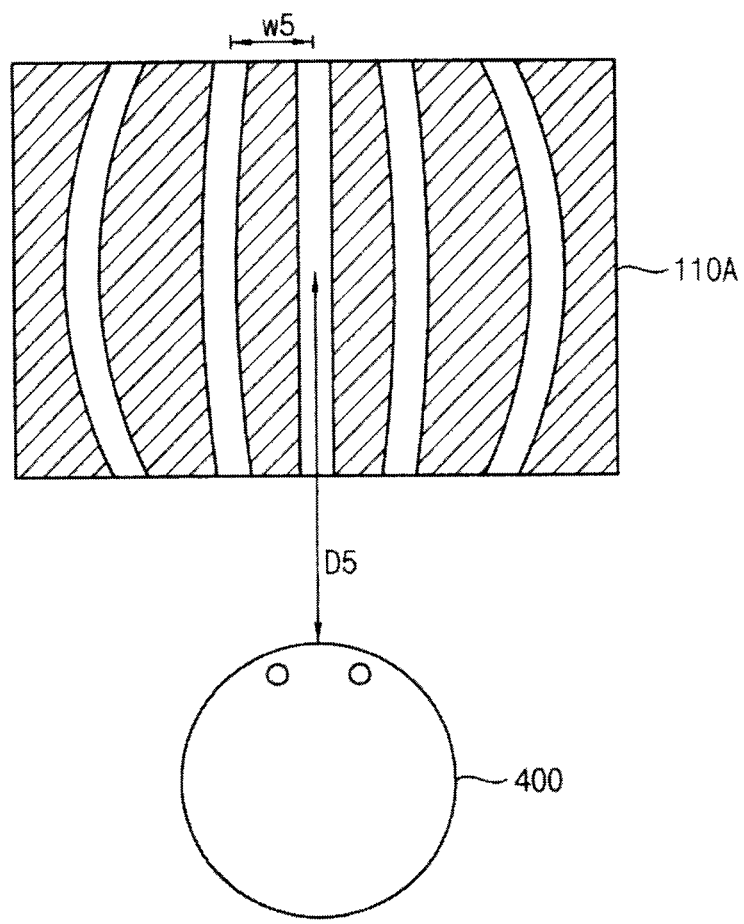
FIGS. 19A and 19B are conceptual diagrams illustrating an exemplary embodiment of a method of driving the barrier panel of FIG. 18A based on a distance of a viewer from the pixel.
Figure 19B:
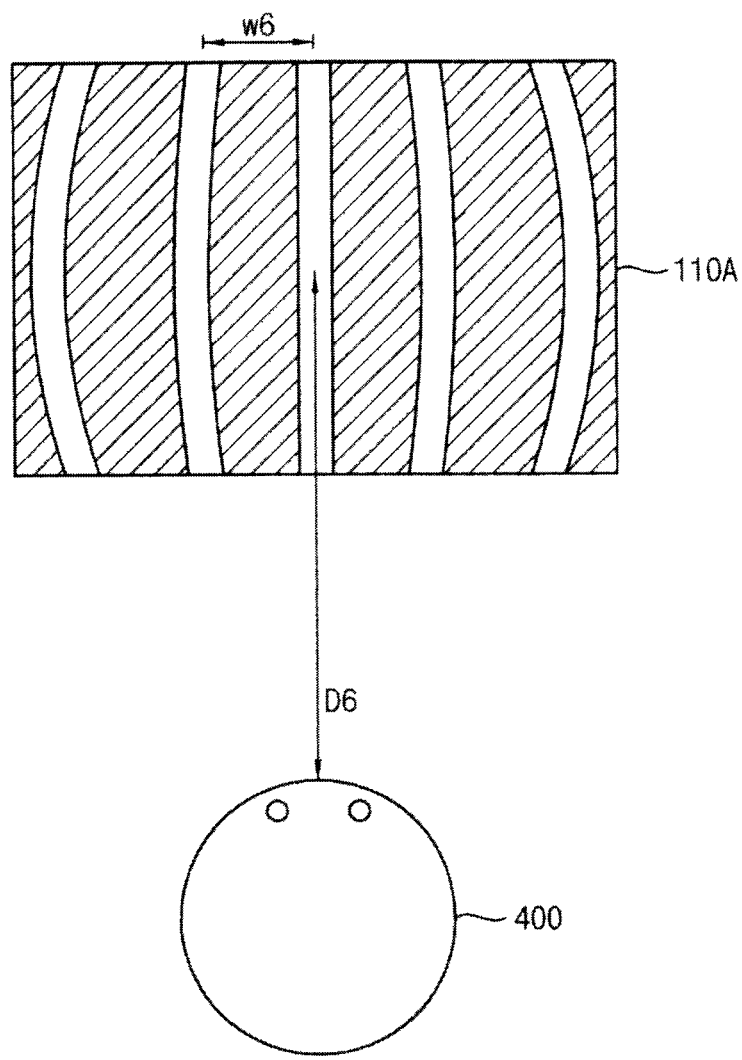

FIGS. 18A and 18B are conceptual diagrams illustrating an exemplary embodiment of a method of driving a barrier panel based on a relative viewer angle according to the invention. FIGS. 19A and 19B are conceptual diagrams illustrating an exemplary embodiment of a method of driving the barrier panel of FIG. 18A based on a distance of a viewer from the pixel.

In an exemplary embodiment, the barrier panel 110A may have a curved line barrier pattern.

Referring to FIGS. 18A and 18B, the curved line barrier pattern is driven to be inclined based on the relative viewer angle θ.

In FIG. 18A, when a viewer direction D400 is substantially parallel to a direction of the panel 100, the curved line barrier pattern may be substantially perpendicular to the viewer direction D400.

In FIG. 18B, when the viewer direction D400 is inclined with respect to the direction of the panel 100, the curved line barrier pattern may be inclined to be substantially perpendicular to the viewer direction D400.

Referring to FIGS. 19A and 19B, the barrier pattern may be adjusted based on the distance of the viewer 400 from the panel 100.

In one exemplary embodiment, for example, when the distance of the viewer 400 from the panel 100 increases, a gap between adjacent transmitting areas of the barrier pattern may be increased.

In FIG. 19A, when the viewer 400 is in a position with a fifth distance D5 from the panel 100, the transmitting areas of the barrier pattern may have a fifth gap w5. In FIG. 19B, when the viewer 400 is in a position with a sixth distance D6, which is greater than the fifth distance D5, from the panel 100, the transmitting areas of the barrier pattern may have a sixth gap w6 greater than the fifth gap w5.

In an exemplary embodiment, when the distance of the viewer 400 from the panel 100 increases, a curvature of the barrier pattern may be decreased.

In an exemplary embodiment, when the viewer 400 is positioned substantially close to the panel 100, the barrier pattern may have a substantially circular shape. When the barrier pattern has the substantially circular shape, a central point of the circular pattern may correspond to a relative position of the viewer 400 with respect to the panel 100. When the viewer 400 is positioned substantially far from the panel 100, the barrier pattern may have a substantially stripe shape.

The barrier pattern may be adjusted based on a distance of the viewer 400 from a pixel of the panel 100. In one exemplary embodiment, for example, when the distance of the viewer 400 from the pixel of the panel 100 increases, a gap between adjacent transmitting areas of the barrier pattern may be increased.

Figure 20A:
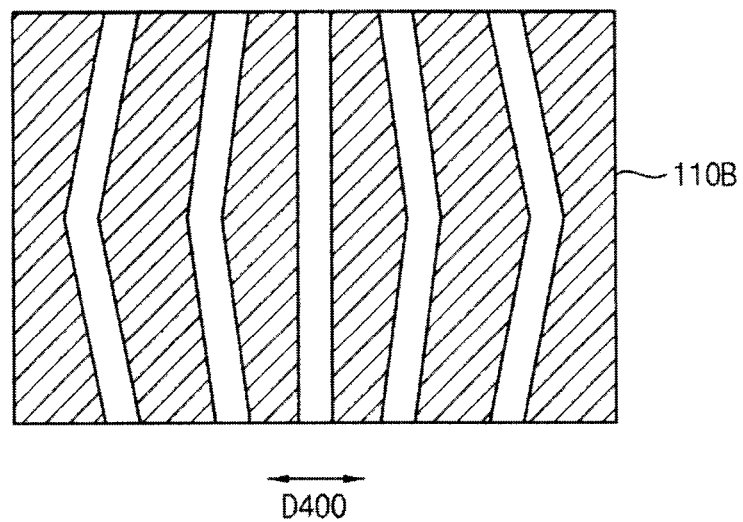
FIGS. 20A and 20B are conceptual diagrams illustrating an exemplary embodiment of a method of driving a barrier panel based on a relative viewer angle according to the invention.
Figure 20B:
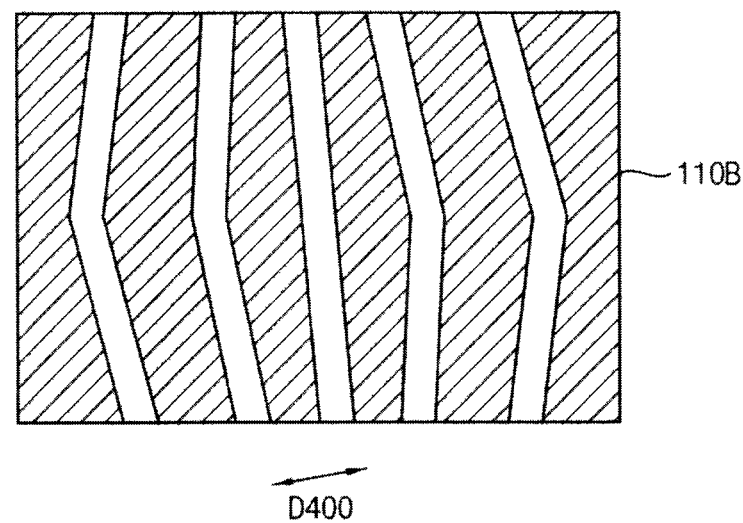
Figure 21A:
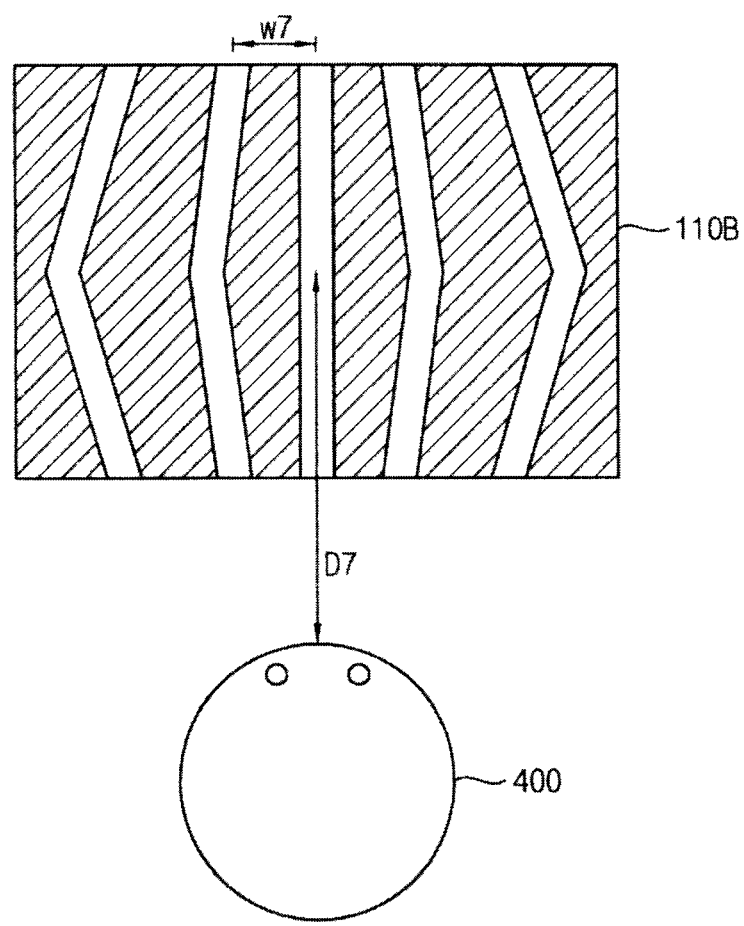
FIGS. 21A and 21B are conceptual diagrams illustrating an exemplary embodiment of a method of driving the barrier panel of FIG. 20A based on a distance of a viewer from the pixel.
Figure 21B:
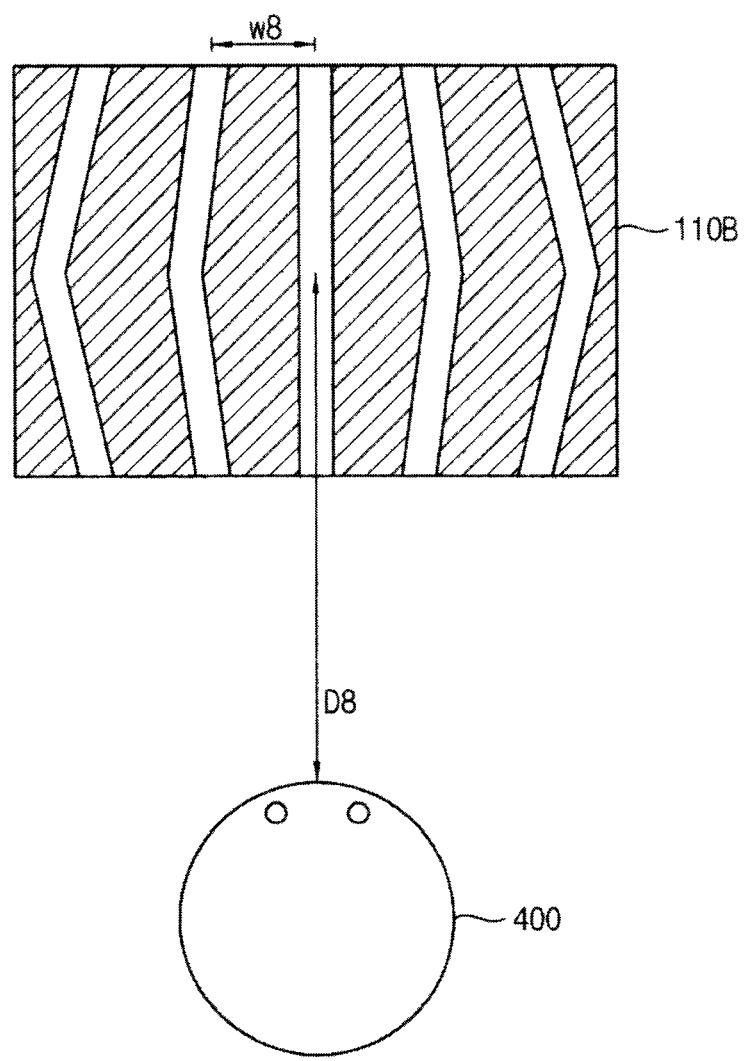

FIGS. 20A and 20B are conceptual diagrams illustrating an exemplary embodiment of a method of driving a barrier panel based on a relative viewer angle according to the invention. FIGS. 21A and 21B are conceptual diagrams illustrating an exemplary embodiment of a method of driving the barrier panel of FIG. 20A based on a distance of a viewer from the pixel.

In an exemplary embodiment, as shown in FIGS. 20A and 20B, the barrier panel 110B has a polygonal line barrier pattern.

Referring to FIGS. 20A and 20B, the polygonal line barrier pattern is driven to be inclined based on the relative viewer angle θ.

In FIG. 20A, when a viewer direction D400 is substantially parallel to a direction of the panel 100, the polygonal line barrier pattern is substantially perpendicular to the viewer direction D400.

In FIG. 20B, when the viewer direction D400 is inclined with respect to the direction of the panel 100, the polygonal line barrier pattern may be inclined to be substantially perpendicular to the viewer direction D400.

Referring to FIGS. 21A and 21B, the barrier pattern may be adjusted based on the distance of the viewer 400 from the panel 100.

In one exemplary embodiment, for example, when the distance of the viewer 400 from the panel 100 increases, a gap between adjacent transmitting areas of the barrier pattern may be increased.

In FIG. 21A, when the viewer 400 is in a position with a seventh distance D7 from the panel 100, the transmitting areas of the barrier pattern may have a seventh gap w7. In FIG. 21B, when the viewer 400 is in a different position with a eighth distance D8, which is greater than the seventh distance D7, from the panel 100, the transmitting areas of the barrier pattern may have an eighth gap w8 greater than the seventh gap w7.

In such an embodiment, when the distance of the viewer 400 from the panel 100 increases, a bending angle of the barrier pattern may be decreased.

In an exemplary embodiment, when the viewer 400 is positioned substantially close to the panel 100, the barrier pattern may have a very great bending angle. In such an embodiment, when the viewer 400 is positioned substantially far from the panel 100, the barrier pattern may have a substantially stripe shape.

The barrier pattern may be adjusted based on a distance of the viewer 400 from a pixel of the panel 100. In one exemplary embodiment, for example, when the distance of the viewer 400 from the pixel of the panel 100 increases, a gap between adjacent transmitting areas of the barrier pattern may be increased.

Figure 22:
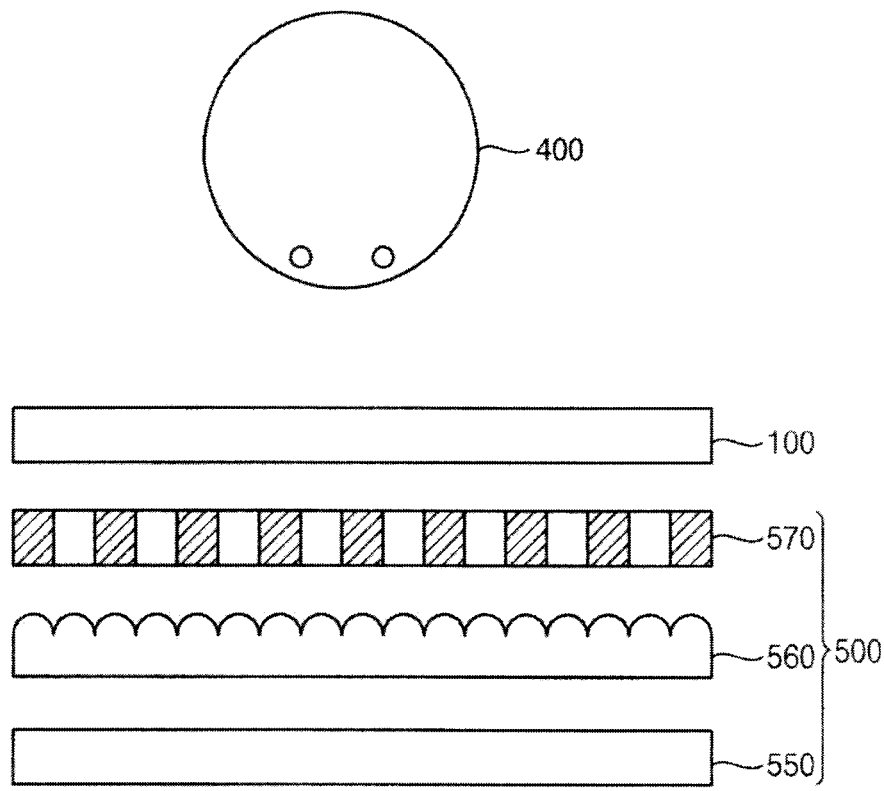
FIG. 22 is a conceptual diagram illustrating an alternative exemplary embodiment of a 3D image display apparatus according to the invention.

FIG. 22 is a conceptual diagram illustrating an alternative exemplary embodiment of a 3D image display apparatus according to the invention.

Referring to FIG. 22, the 3D image display apparatus includes a panel 100 and a directional backlight unit 500. The panel 100 includes a plurality of pixels arraigned substantially in a matrix form. The panel 100 displays an image using the pixels. The directional backlight unit 500 is disposed under the panel 100. The directional backlight unit 500 adjusts a path of light provided to the panel 100 to transmit the image on the panel 100 to eyes of the viewer.

In one exemplary embodiment, for example, the panel 100 and the directional backlight unit 500 are driven in a time division driving method. In a first subframe of a frame, the panel 100 displays a left image and the directional backlight unit 500 generates light in a first light path to guide the image on the panel 100 to a left eye of the viewer 400. In a second subframe of the frame, the panel 100 displays a right image and the directional backlight unit 500 generates light in a second light path to guide the image on the panel 100 to a right eye of the viewer 400.

In one exemplary embodiment, for example, the directional backlight unit 500 includes a light source 550 that generates light, a lens part 560 disposed on the light source 550 and a barrier part 570 disposed on the lens part 560.

The directional backlight unit 500 has a plurality of light sources arranged substantially in a matrix form such that the directional backlight unit 500 may generate various patterns. Similarly to the barrier pattern described above referring to FIGS. 15 to 21B, the directional backlight unit 500 may generates patterns inclined based on the relative viewer angle and be adjusted based on a distance of the viewer from the panel and a distance of the viewer from the pixel.

In an exemplary embodiment, the directional backlight unit 500 may generate patterns corresponding to the barrier pattern having a stripe pattern described above referring to FIGS. 16A to 17. In an exemplary embodiment, the directional backlight unit 500 may generate patterns corresponding to the barrier pattern having a curved line pattern described above referring to FIGS. 18A to 19B. In an exemplary embodiment, the directional backlight unit 500 may generate patterns corresponding to the barrier pattern having a polygonal line pattern described above referring to FIGS. 20A to 21B.

Figure 23:
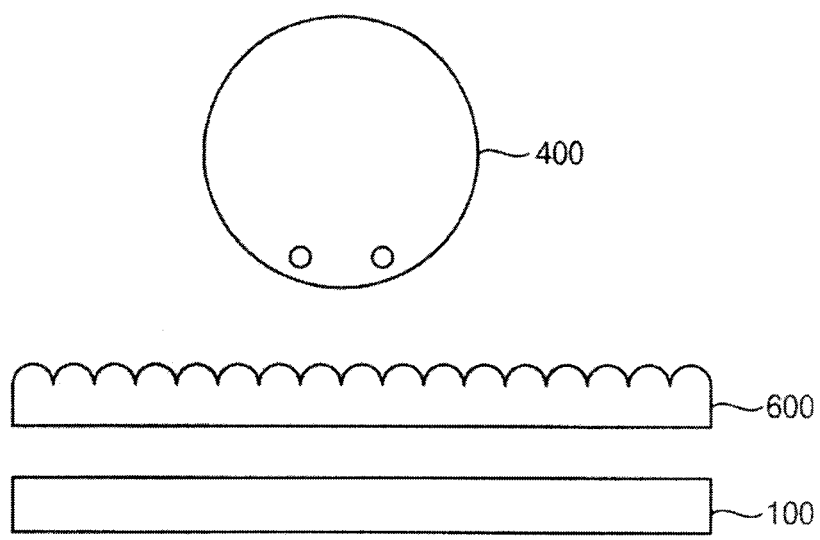
FIG. 23 is a conceptual diagram illustrating another alternative exemplary embodiment of a 3D image display apparatus according to the invention.

FIG. 23 is a conceptual diagram illustrating another alternative exemplary embodiment of a 3D image display apparatus according to the invention.

Referring to FIG. 23, the 3D image display apparatus includes a panel 100 and a liquid crystal lens panel 600. The panel 100 includes a plurality of pixels arranged substantially in a matrix form. The panel 100 displays an image using the pixels. The liquid crystal lens panel 600 is disposed on the panel 100. The liquid crystal lens panel 600 refracts light to transmit the image on the panel 100 to eyes of the viewer.

In one exemplary embodiment, for example, the panel 100 and the liquid crystal lens panel 600 are driven in a time division driving method. In a first subframe of a frame, the panel 100 displays a left image and the liquid crystal lens panel 600 allows light to travel in a first light path to guide the image on the panel 100 to a left eye of the viewer 400. In a second subframe of the frame, the panel 100 displays a right image and the liquid crystal lens panel 600 allows light to travel in a second light path to guide the image on the panel 100 to a right eye of the viewer 400.

The liquid crystal lens panel 600 may include a plurality of liquid crystal lenses arranged substantially in a matrix form such that the liquid crystal lens panel 600 may generates various patterns. Similarly to the barrier pattern described above referring to FIGS. 15 to 21B, the liquid crystal lens panel 600 may be inclined based on the relative viewer angle and be adjusted based on a distance of the viewer from the panel and a distance of the viewer from the pixel.

In an exemplary embodiment, the liquid crystal lens panel 600 may generate a pattern corresponding to the barrier pattern having a stripe pattern described above referring to FIGS. 16A to 17. In an exemplary embodiment, the liquid crystal lens panel 600 may generates a pattern corresponding to the barrier pattern having a curved line pattern described above referring to FIGS. 18A to 19B. In an exemplary embodiment, the liquid crystal lens panel 600 may generates a pattern corresponding to the barrier pattern having a polygonal line pattern described above referring to FIGS. 20A to 21B.

As described above, according to embodiments of the method of displaying 3D image and the 3D image display apparatus of the invention, the relative viewer angle may be determined using the absolute angle of the panel and the absolute angle of the viewer. The image compensated based on the relative viewer angle is outputted such that a 3D image is effectively recognized by the viewer when the viewer is relatively inclined with respect to the display panel.

In such embodiments, the barrier panel, the directional backlight unit and the liquid crystal lens panel are driven based on the relative viewer angle such that a 3D image is effectively recognized by the viewer when the viewer is relatively inclined with respect to the display panel.

In such embodiments, the 3D image is compensated based on the distance between eyeballs and the thickness of the crystalline lens of the viewer such that the viewer may view the 3D image in a convenient circumstance.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A three-dimensional (3D) image display apparatus comprising:
   a panel comprising a plurality of pixels and which displays an image;
   a relative viewer angle determining part which determines a relative viewer angle, wherein the relative viewer angle is a relative angle of a viewer with respect to the panel; and
   a light converting part which transmits the image on the panel to a left eye and a right eye of the viewer based on the relative viewer angle, wherein the light converting part comprises a plurality of light converting units which is arranged substantially in a matrix form and generates a pattern,
   wherein the pattern is inclined based on the relative viewer angle,
   wherein the pattern is adjusted based on a distance of the viewer from the panel, and
   wherein the pattern is a barrier pattern including transmitting areas in a curved line shape, when the distance of the viewer from the panel increased, a gap between adjacent transmitting areas of the barrier pattern is increased, and when the distance of the viewer from the panel increases, a curvature of the pattern is decreased.

2. The 3D image display apparatus of claim 1, wherein the pattern is adjusted based on a distance of the viewer from the pixels of the panel.

3. A three-dimensional (3D) image display apparatus comprising:
   a panel comprising a plurality of pixels and which displays an image;
   a relative viewer angle determining part which determines a relative viewer angle, wherein the relative viewer angle is a relative angle of a viewer with respect to the panel; and
   a light converting part which transmits the image on the panel to a left eye and a right eye of the viewer based on the relative viewer angle, wherein the light converting part comprises a plurality of light converting units which is arranged substantially in a matrix form and generates a pattern,
   wherein the pattern is inclined based on the relative viewer angle,
   wherein the pattern is adjusted based on a distance of the viewer from the panel, and
   wherein
   the pattern is a barrier pattern including transmitting areas in a polygonal line shape,
   when the distance of the viewer from the panel increases, a gap between adjacent transmitting areas of the barrier pattern is increased, and
   when the distance of the viewer from the panel increases, a bending angle of the polygonal line shape is decreased.

4. A method of displaying a three-dimensional (3D) image, the method comprising:
   determining a relative viewer angle, wherein the relative viewer angle is a relative angle of a viewer with respect to a panel which displays the 3D image; and
   outputting a compensated image based on the relative viewer angle,
   wherein the panel comprises:
   an image display panel which displays an image; and
   a barrier panel disposed on the image display panel, wherein the barrier panel comprises a plurality of barrier units which generates a barrier pattern, wherein the barrier pattern is inclined based on the relative viewer angle, wherein the barrier pattern is adjusted based on a distance of the viewer from the panel, and wherein the barrier pattern includes transmitting areas in a curved line shape, when the distance of the viewer from the panel increases, a gap between adjacent transmitting areas of the barrier pattern is increased, and when the distance of the viewer from the panel increases, a curvature of the pattern is decreased.

5. The method of claim 4, wherein the outputting the compensated image based on the relative viewer angle comprises controlling the barrier pattern based on the relative viewer angle.

6. The method of claim 5, wherein the barrier units are arranged substantially in a matrix shape.

7. The method of claim 6, wherein the barrier pattern has a plurality of stripe patterns substantially parallel to each other.

8. The method of claim 7, wherein a width of the stripe patterns and a gap of the stripe patterns are adjusted based on the relative viewer angle.

9. The method of claim 8, wherein the width of the stripe patterns and the gap of the stripe patterns decrease when the relative viewer angle decreases.

10. The method of claim 4, wherein the determining the relative viewer angle comprises:

determining an absolute angle of the panel with respect to a direction of gravity;

determining an absolute angle of eyeballs of the viewer with respect to the direction of gravity; and calculating the relative viewer angle using the absolute angle of the panel and the absolute angle of the eyeballs of the viewer.

11. The method of claim 10, wherein the determining the absolute angle of the panel comprises using a panel sensor provided in the panel.

12. The method of claim 10, wherein the determining the absolute angle of the eyeballs of the viewer comprises using a sensor which detects the eyeballs of the viewer.

13. The method of claim 10, wherein the determining the absolute angle of the eyeballs of the viewer comprises using a sensor provided in glasses of the viewer.

14. The method of claim 4, wherein the determining the relative viewer angle comprises using a sensor in the panel, wherein the sensor detects eyeballs of the viewer.

15. The method of claim 4, wherein the outputting the compensated image based on the relative viewer angle comprises providing light in a path corresponding to viewpoints of the viewer using a directional backlight unit, and the directional backlight unit comprises a plurality of backlight portions independently driven and arranged substantially in a matrix form, wherein the directional backlight unit is driven in an inclined direction corresponding to the relative viewer angle.

16. The method of claim 4, wherein the outputting the compensated image based on the relative viewer angle comprises providing images corresponding to viewpoints of the viewer using a liquid crystal lens panel, and the liquid crystal lens panel comprising a plurality of liquid crystal lenses independently driven and arranged substantially in a matrix form, wherein the liquid crystal lens panel is driven in an inclined direction corresponding to the relative viewer angle.

17. The method of claim 4, wherein the outputting the compensated image based on the relative viewer angle comprises compensating an image direction of the 3D image generated based on the relative viewer angle.

18. The method of claim 17, wherein the compensating the image direction comprising increasing a distance between a left image and a right image for the viewer from each other in a direction corresponding to the relative viewer angle.

19. The method of claim 4, further comprising:

detecting a relative position of the viewer with respect to the panel; and compensating the image based on the relative position of the viewer.

20. The method of claim 19, wherein the compensating the image based on the relative position of the viewer comprises reconstructing a portion of an object in the image shown to the viewer based on the relative position of the viewer by a data converting method.

21. The method of claim 4, further comprising:

detecting a distance between eyeballs of the viewer; and compensating the image based on the distance between the eyeballs of the viewer.

22. The method of claim 21, wherein left and right images of a close image are converted to overlap each other in 3D image data, when the distance between the eyeballs is less than a predetermined distance.

23. The method of claim 21, wherein left and right images of a central image are converted to overlap each other in 3D image data, when the distance between the eyeballs is substantially the same as a predetermined distance.

24. The method of claim 21, wherein left and right images of a far image are converted to overlap each other in 3D image data, when the distance between the eyeballs is greater than a predetermined distance.

25. The method of claim 4, further comprising:

detecting a thickness of a crystalline lens of the viewer; and compensating the image based on the thickness of the crystalline lens of the viewer.

26. The method of claim 25, wherein left and right images of a close image are converted to overlap each other in 3D image data, when the thickness of the crystalline lens of the viewer is greater than a predetermined thickness.

27. The method of claim 25, wherein left and right images of a far image are converted to overlap each other in 3D image data, when the thickness of the crystalline lens of the viewer is less than a predetermined thickness.

28. The method of claim 4, further comprising:

determining an image source.

29. The method of claim 28, wherein the image source comprises a stereo camera image, a two-dimensional (2D) image and a 3D rendering image, the stereo camera image comprises a first camera image corresponding to a left image for the left eye of the viewer, and a second camera image corresponding to a right image for the right eye of the viewer, and the 3D rendering image comprises a plurality of images corresponding to a plurality of viewpoints.

30. The method of claim 29, further comprising:
rearranging the first camera image and the second camera image corresponding to the relative viewer angle when the image source is the stereo camera image.

31. The method of claim 29, further comprising:
converting the 2D image into a left image and a right image corresponding to the relative viewer angle when the image source is the 2D image.

32. The method of claim 29, further comprising:
compensating the 3D rendering image based on a position of the viewer to generate a position-compensated 3D rendering image; and
converting the position-compensated 3D rendering image into a left image and a right image corresponding to the relative viewer angle when the image source is the 3D rendering image.

* * * * *